(12) United States Patent
Moustafa et al.

(10) Patent No.: US 12,490,067 B2
(45) Date of Patent: Dec. 2, 2025

(54) SYSTEMS AND METHODS FOR AUTONOMOUS VEHICLE COMMUNICATION

(71) Applicant: Apple Inc., Cupertino, CA (US)

(72) Inventors: Hassnaa Moustafa, Portland, OR (US); Bahareh Sadeghi, Portland, OR (US); Shengbo Xu, Newark, CA (US); Tolga Acikalin, San Jose, CA (US); Javier Perez-Ramirez, North Plains, OR (US); Richard D. Roberts, Hillsboro, OR (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 18/673,011

(22) Filed: May 23, 2024

(65) Prior Publication Data
US 2024/0314529 A1   Sep. 19, 2024

Related U.S. Application Data

(62) Division of application No. 16/369,560, filed on Mar. 29, 2019, now Pat. No. 12,082,086.

(51) Int. Cl.
*H04W 4/44* (2018.01)
*G06N 20/00* (2019.01)
(Continued)

(52) U.S. Cl.
CPC .............. *H04W 4/44* (2018.02); *G06N 20/00* (2019.01); *H04B 10/11* (2013.01); *H04W 8/08* (2013.01);
(Continued)

(58) Field of Classification Search
CPC ........ G06N 20/00; H04B 10/11; H04L 63/08; H04L 63/0838; H04L 67/12; H04L 67/34;
(Continued)

(56) References Cited

U.S. PATENT DOCUMENTS

| 10,419,106 B1 | 9/2019 | Liu |
| 2010/0306368 A1 | 12/2010 | Gagliardi |

(Continued)

FOREIGN PATENT DOCUMENTS

| CN | 102118401 | 7/2011 |
| CN | 104253838 | 12/2014 |

(Continued)

OTHER PUBLICATIONS

Office Action for CN Patent Application No. 2020800076803; Nov. 2, 2024.
(Continued)

*Primary Examiner* — Nizam U Ahmed
(74) *Attorney, Agent, or Firm* — Kowert, Hood, Munyon, Rankin & Goetzel, P.C.

(57) ABSTRACT

The subject matter described herein presents various technical solutions for the technical problems facing autonomous vehicles (e.g., fully autonomous and semi-autonomous vehicles). To address technical problems facing wireless communication cost and latency, a heterogeneous roadside infrastructure can be used to improve the ability for a vehicle to communicate with a data source. To address technical problems facing interruption of vehicle services due to an abrupt loss of connection, a quality of service system provides the ability to determine and share quality of service information, such as location-based information, maps, interference data, and other quality of service information. To address technical problems facing high volume data upload and download between autonomous vehicles and cloud-based data services, optical wireless communication (OWC) provides increased data throughput and reduced complexity and may be beneficial for short-range high-mobility wireless communications.

20 Claims, 18 Drawing Sheets

(51) Int. Cl.
  *H04B 10/11* (2013.01)
  *H04W 8/08* (2009.01)
  *H04W 8/24* (2009.01)
  *H04W 12/03* (2021.01)
  *H04W 12/069* (2021.01)

(52) U.S. Cl.
  CPC ............ *H04W 8/24* (2013.01); *H04W 12/03* (2021.01); *H04W 12/069* (2021.01)

(58) Field of Classification Search
  CPC ...... H04L 67/51; H04L 67/568; H04W 12/03; H04W 12/06; H04W 12/069; H04W 4/44; H04W 8/08; H04W 8/24
  USPC .......................................................... 370/329
  See application file for complete search history.

(56) References Cited

U.S. PATENT DOCUMENTS

| | | | |
|---|---|---|---|
| 2014/0153504 A1* | 6/2014 | Wang | H04W 28/14 370/329 |
| 2016/0055488 A1 | 2/2016 | Bims | |
| 2018/0260884 A1 | 9/2018 | Bhanote | |
| 2018/0322785 A1 | 11/2018 | Jerichow | |
| 2019/0268777 A1 | 8/2019 | Simon | |
| 2019/0319793 A1 | 10/2019 | Schooler | |
| 2020/0053155 A1* | 2/2020 | Shi | G06N 5/046 |
| 2020/0252789 A1* | 8/2020 | Zheng | H04L 67/568 |
| 2020/0266991 A1 | 8/2020 | Waters | |
| 2020/0336908 A1 | 10/2020 | Kim | |
| 2021/0274387 A1* | 9/2021 | Kousaridas | H04W 28/24 |
| 2022/0150292 A1 | 5/2022 | Mo | |

FOREIGN PATENT DOCUMENTS

| | | |
|---|---|---|
| CN | 108650657 | 10/2018 |
| CN | 109417536 | 3/2019 |
| WO | 2018182732 | 10/2018 |

OTHER PUBLICATIONS

International Search Report in Europe for International Application No. PCT/US2020/025549; Aug. 12, 2020.

Office Action for CN Patent Application No. 2020800076803; Mar. 1, 2024.

* cited by examiner

SYSTEMS AND METHODS FOR AUTONOMOUS VEHICLE COMMUNICATION

PRIORITY INFORMATION

This application is a divisional of U.S. patent application Ser. No. 16/369,560, entitled "Systems and Methods for Autonomous Vehicle Communication," filed Mar. 29, 2019, which is hereby incorporated by reference in its entirety as though fully and completely set forth herein. The claims in the instant application are different than those of the parent application or other related applications. The Applicant therefore rescinds any disclaimer of claim scope made in the parent application or any predecessor application in relation to the instant application. The Examiner is therefore advised that any such previous disclaimer and the cited references that it was made to avoid, may need to be revisited. Further, any disclaimer made in the instant application should not be read into or against the parent application or other related applications.

TECHNICAL FIELD

Some aspects of the present disclosure relate to vehicle navigation. More specifically, some aspects relate to vehicle data communication during vehicle navigation.

BACKGROUND

Modern vehicles may upload or download significant amounts of data. For example, autonomous vehicles may upload data continually to the cloud (e.g., a data center, a cloud computing environment, and other cloud-based data environments), data that may be used for tuning autonomous driving algorithms based on individual data or based on test vehicle fleets. Vehicles may also continually download data, such as real-time surrounding car data, map downloads, media downloads, or other data. Although some wireless communication (e.g., 5G) channels may provide high data bandwidth, these communication channels often require expensive vehicle data plans. Other wireless communication protocols, such as Wi-Fi and WiGig technologies, provide data communication but with significant bandwidth (e.g., bits per second throughput) constraints for large amounts of data. The performance of each of these communication protocols may be reduced further, such as due to non-line of sight communications and outdoor environment challenges. What is needed is an improved solution for transmission of vehicular data.

BRIEF DESCRIPTION OF THE DRAWINGS

To identify the discussion of any particular element or act, the most significant digit or digits in a reference number refer to the figure number in which that element is first introduced. Further, like numbers indicate like components.

DETAILED DESCRIPTION

The subject matter described herein presents various technical solutions for the technical problems facing autonomous vehicles (e.g., fully autonomous and semi-autonomous vehicles). To address technical problems facing wireless communication cost and latency, a heterogeneous roadside infrastructure can be used to improve the ability for a vehicle to communicate with a data source. To address technical problems facing interruption of vehicle services due to an abrupt loss of connection, a quality of service system provides the ability to determine and share quality of service information, such as location-based information, maps, interference data, and other quality of service information. To address technical problems facing high volume data upload and download between autonomous vehicles and cloud-based data services, optical wireless communication (OWC) provides increased data throughput and reduced complexity, and may be beneficial for short-range high-mobility wireless communications.

The description that follows includes systems, methods, techniques, instruction sequences, and computing machine program products that embody illustrative aspects of the disclosure. In the following description, for the purposes of explanation, numerous specific details are set forth in order to provide an understanding of various aspects of the inventive subject matter. It will be evident, however, to those skilled in the art, that aspects of the inventive subject matter may be practiced without these specific details. In general, well-known instruction instances, protocols, structures, and techniques are not necessarily shown in detail.

Figure 1:
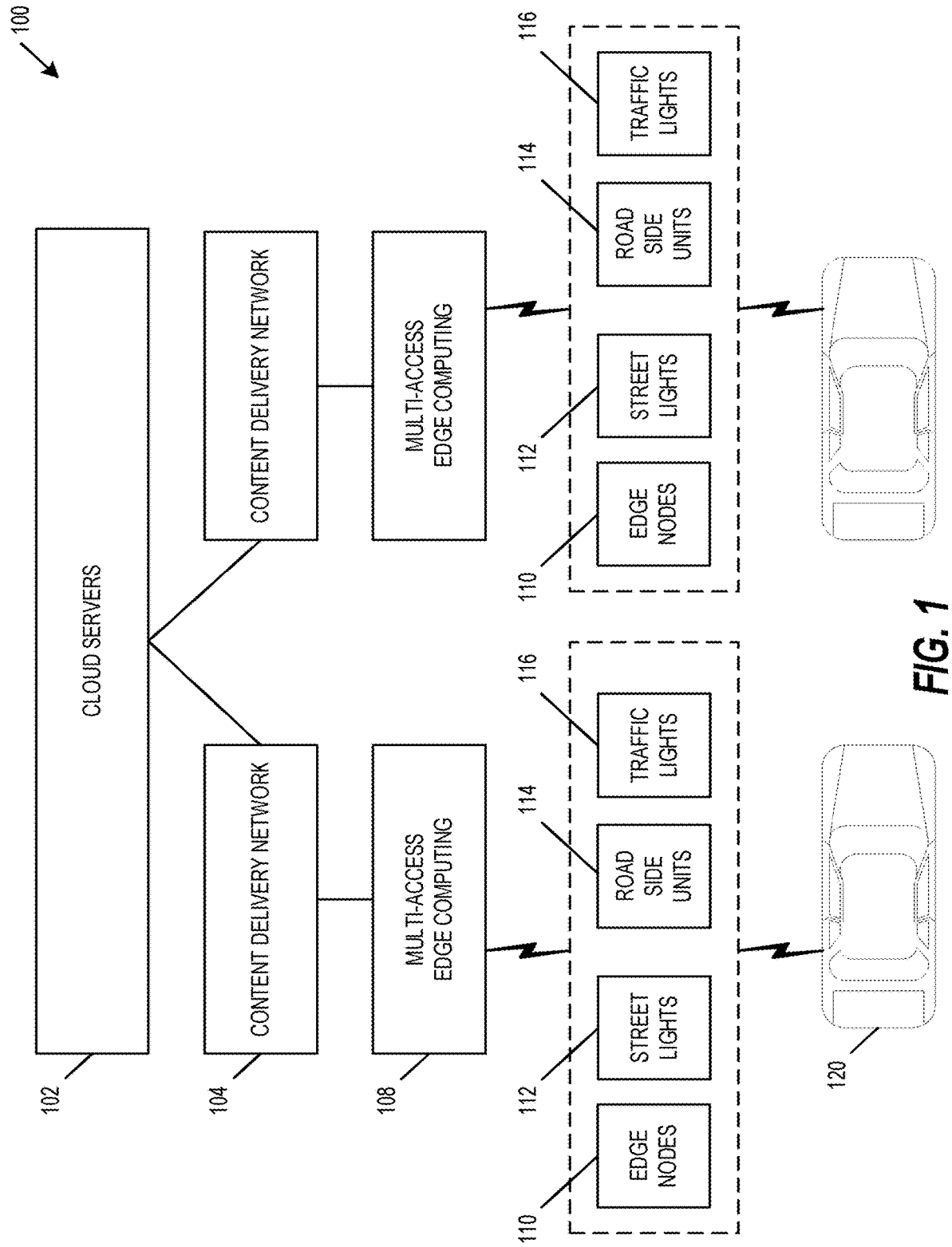
FIG. 1 is a diagram depicting an exemplary heterogeneous infrastructure, in accordance with some aspects.

FIG. 1 is a diagram depicting an exemplary heterogeneous infrastructure 100, in accordance with some aspects. To support the increasing number of autonomous vehicles, there is a need to provide improved services to the vehicles. These services may rely on communication between the vehicle and a data source, such as the cloud. These services may include real-time services, such as smart parking, providing over-the-air (OTA) updates for vehicle software, firmware, and security patches, providing traffic and weather alerts in real-time that are specific to the vehicle location, providing entertainment and office services for passengers, downloading and updating of high definition (HD) maps (e.g., high level of three-dimensional navigation detail) during a drive, and other services. The continuous dependency of these services on the cloud (including, e.g., wide-area networks (WANs), the Internet, and other cloud-based data connections) increases network cost for carriers. Further, the current wireless carriers may not have sufficient bandwidth for real-time services, where even 5G access often includes several sequential communication paths (e.g., communication hops) between the vehicle and the cloud, where each communication path adds to latency.

To provide improved vehicle services, the heterogeneous infrastructure 100 improves the ability for a vehicle to communicate with a data source. In particular, heterogeneous infrastructure 100 provides a heterogeneous infrastructure along a road. In some aspects, this heterogeneous infrastructure 100 allows vehicular services to be served by multiple infrastructure owners seamlessly as a vehicle passes by multiple access nodes implemented in roadside devices. The infrastructure may include these access nodes implemented in roadside devices, where the access nodes may include edge nodes 110, street lights 112, roadside units (RSUs) 114, traffic lights 116, or other fog or edge computing nodes. A vehicle 120 may communicate through edge nodes 110 or other roadside devices, through a multi-access edge computing (MEC) device 108, and through a content delivery network (CDN) device 104 to data stored in cloud servers 102. In operation, each service provider may advertise existing services to vehicles through the closest point to each vehicle. The service provider may include a home carrier for the vehicle, a foreign carrier, or a foreign non-carrier service provider. In an aspect, the service provider includes an over-the-top (OTT) player. Using the heterogeneous infrastructure 100, vehicles may subscribe on-demand to each needed service, and may have seamless access to services from the heterogeneous infrastructure 100 directly, independent of the service provider. In an aspect, a home carrier for the vehicle subscription may remain the point of contact for authentication of the vehicle for service access from any service provider or carrier.

The heterogeneous infrastructure 100 may improve the operation of autonomous vehicle services by supporting services that are regional and do not require continuous communication with the backend cloud. The heterogeneous infrastructure 100 provides an infrastructure that is heterogeneous in that it provides the ability for vehicles to discover and access available services, and the ability to provide seamless services access to vehicles across the heterogeneous infrastructure 100 and heterogeneous services providers. For example, a vehicle 120 may communicate with an RSU 114 back to cloud servers 102, which may provide information about services available at that RSU 114 and other RSUs in the vicinity or in the direction of travel. This sharing of information across access nodes improves availability of information regarding available services provided by carriers and service providers, which improves the ability of a home carrier or service providers to provide to their subscribers' vehicles the list of available services from any carrier or service provider at any time in any region. This sharing of information across access nodes also improves real-time services and services continuity, which improves the performance of communication to and from connected and autonomous vehicles.

From the perspective of the vehicle operator, this heterogeneous infrastructure 100 provides transparent service access for autonomous vehicles with horizontal and vertical roaming. For example, the provided horizontal roaming allows continuous services access with services roaming across the infrastructure of the same provider, and the provided vertical roaming allows continuous services access with services roaming across the infrastructure of different service providers. This heterogeneous infrastructure 100 provides a distributed infrastructure as multi-tenant to service providers, which is used to provide seamless service access to an autonomous vehicle based on the services advertisement data set and for any service provider.

In addition to improving the provision of real-time services for vehicles, the heterogeneous infrastructure 100 may provide the ability of a service or hardware provider (e.g., MEC provider, fog node provider) to improve vehicle safety by improving autonomous vehicle mapping through improved gathering of vehicular data. The use of roadside devices also improves the ability of a city or other area to improve provisioning of other services, such as for smart city and additional road services.

Figure 2:
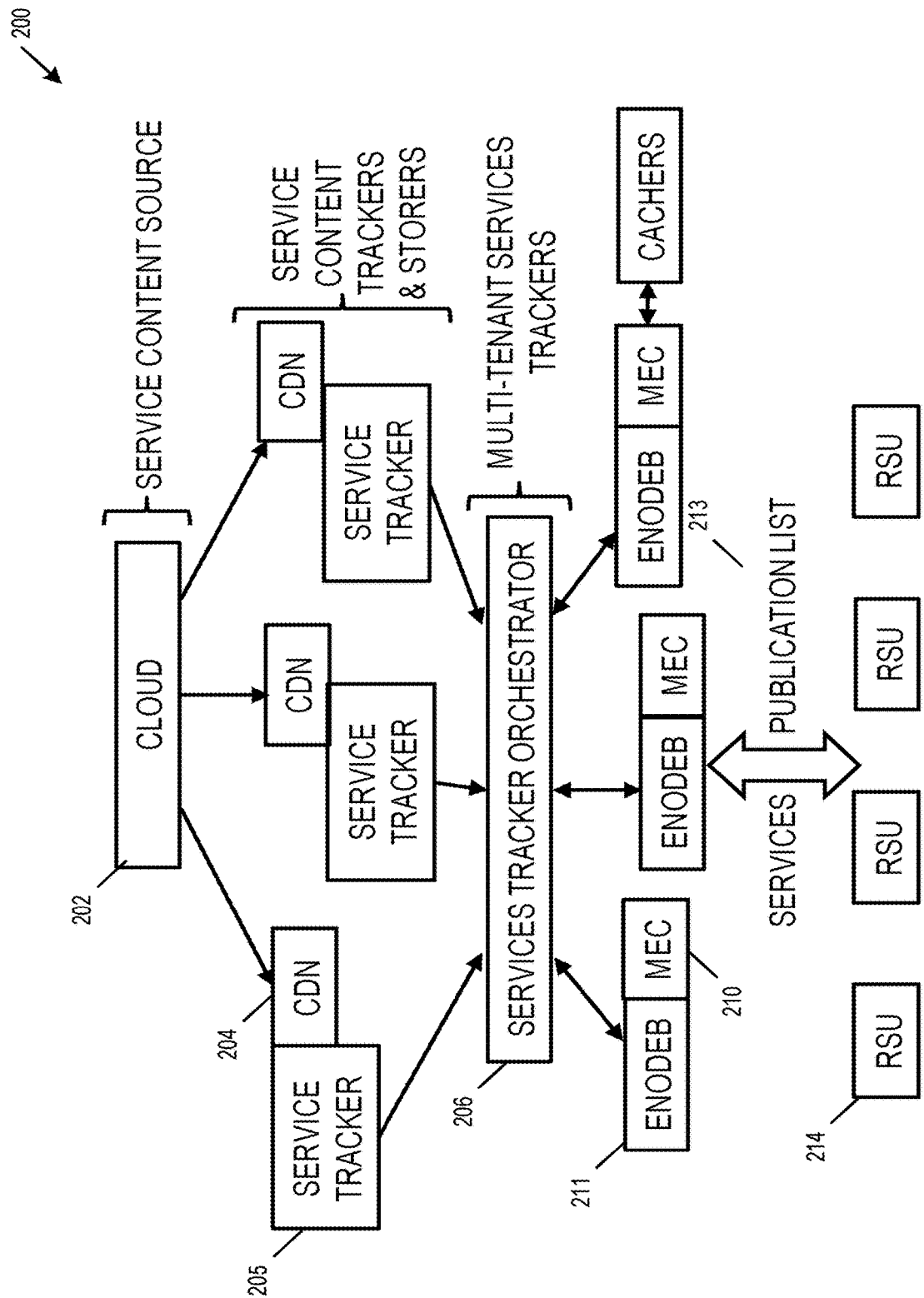
FIG. 2 is a diagram depicting a heterogeneous infrastructure content distribution system, in accordance with some aspects.

FIG. 2 is a diagram depicting a heterogeneous infrastructure content distribution system 200, in accordance with some aspects. The content distribution system 200 includes a service content source, such as a cloud 202. The cloud 202 communicates with one or more service content trackers and storage devices, such as one or more CDNs 204 and one or more service trackers 205. The service trackers 205 for difference services share information through a services tracker orchestrator 206, such as information regarding the type of service and the location of the service in the CDN 204. In some aspects, a point-to-point (P2P) protocol (e.g., peer-to-peer streaming protocol (PPSP)) may be used for this information sharing.

The services tracker orchestrator 206 in turn communicates with one or more fog node communication devices, such as eNodeB 211. Each eNodeB 211 may have an associated mobile edge computing (MEC) device 210. Each MEC device acts as an extension of each CDN 204, such as by providing network-based caching of content for services from diverse CDN providers. A service publication list 213 is distributed to vehicles, such as directly by each MEC 210 or indirectly through one or more RSUs 214. The MEC 210 or RSUs 214 may be positioned along the road, and may query the services tracker orchestrator 206 about content locations for services across the various CDNs 204. This query may take place through a P2P protocol, such as PPSP. In an aspect, each of the RSUs 214 may get information in real-time from one or more of the MECs 210 or the RSUs 214 on available services through a subscription protocol, such as message queuing telemetry transport (MQTT) protocol. Vehicles positioned or traveling along the road get information on available services and their location across the heterogonous infrastructure from RSUs 214, MECs 210, or through eNodeB 211 fog nodes. Using this information, the vehicles may select the services needed by the vehicle based on services to which the vehicle has access. The connectivity from RSUs 214 to vehicles can be through vehicle-to-everything (V2X) in LTE or 5G communication infrastructures, or may use other wireless connectivity. The connectivity from RSUs 214 to the eNodeB 211 fog nodes and to the MECs 210 may include Millimeter Wave communication (mmWave communication). The connectivity from one or more of the MECs 210 to various CDNs 204 may include communication through wired optical or Gigabit (Gbit) Ethernet communication links.

Figure 3:
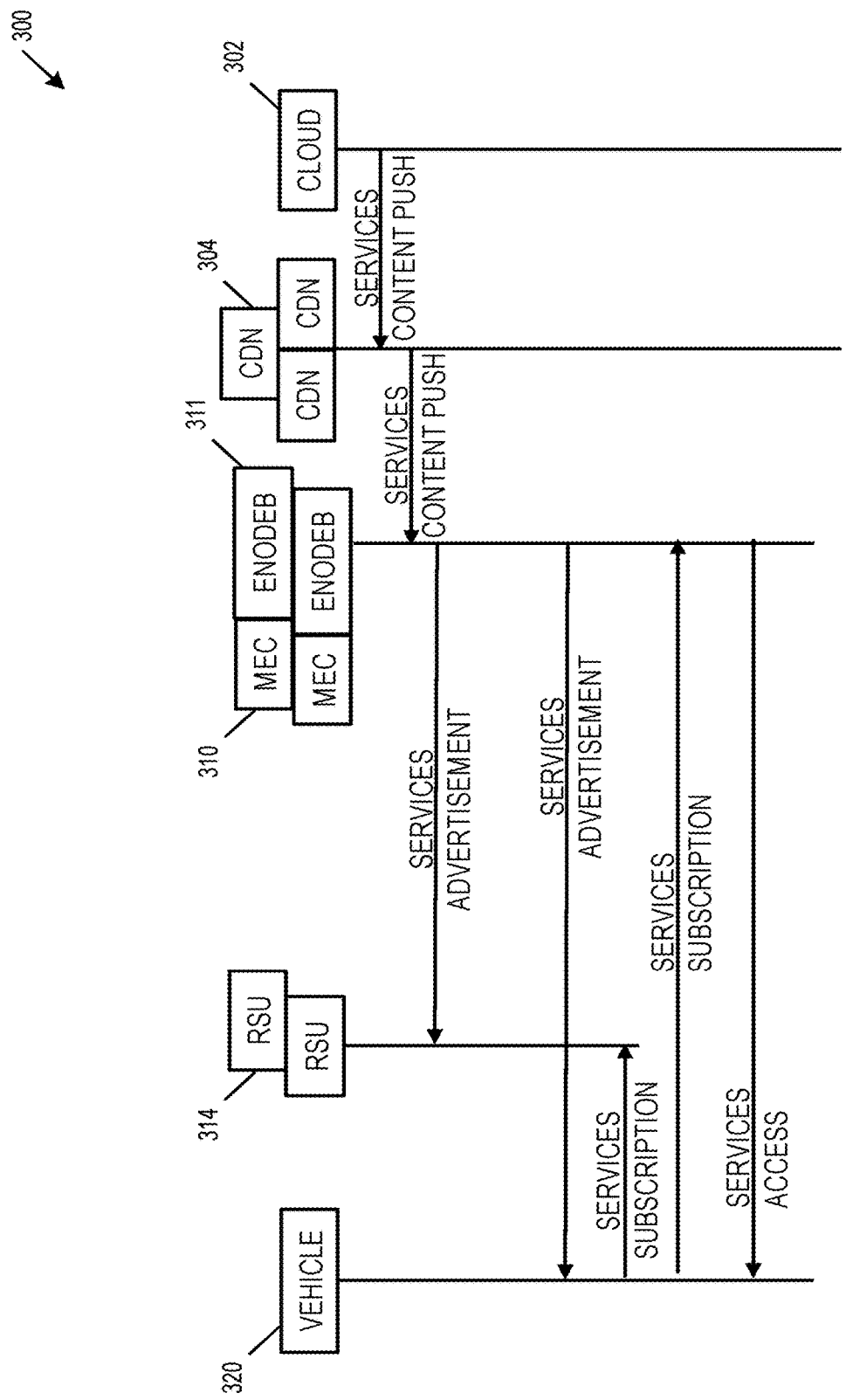
FIG. 3 is a diagram depicting a first vehicle service access flow, in accordance with some aspects.

FIG. 3 is a diagram depicting a first vehicle service access flow 300, in accordance with some aspects. The first vehicle service access flow 300 shows an example communication flow for vehicles service access from cloud 302 (e.g., a home carrier cloud). The home carrier cloud 302 associated with the vehicle may include the service provider for one or more specific services that the vehicle needs on the road, such as maps distribution, providing over-the-air (OTA) updates, and other services.

In this aspect, the vehicle 320 uses an on-demand subscription to services, such as services selected based on need per location or road segment. In operation, the cloud 203 provides a services content push to one or more CDNs 304, which in turn provide a services content push to one or more eNodeB fog nodes 311 or MECs 310. A services advertisement is provided to one or more RSUs 314 and to the vehicle 320. If there are no RSUs 314 on a road segment, the services advertisement may take place directly from the MEC 310. Vehicles 320 may provide a services subscription back to the MECs 310 to subscribe to services on-demand, such as using a pub-sub model such as MQTT. Finally, the MECs 310 may provide services access to the vehicle 320. Communication may take place through the carrier network infrastructure, which may include authentication and authorization for services access performed by the home carrier 302 based on the vehicle's subscription to the service.

Figure 4:
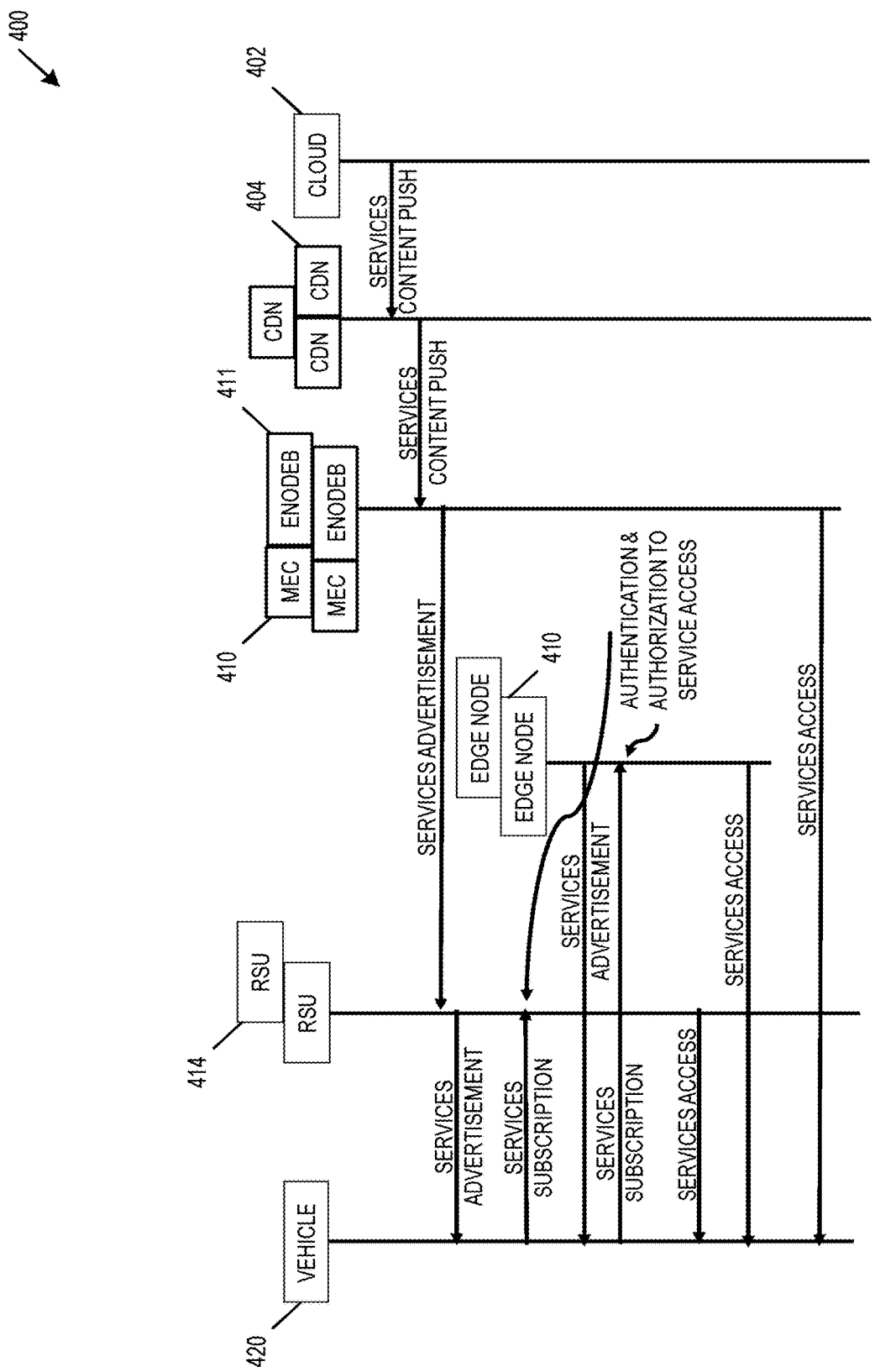
FIG. 4 is a diagram depicting a second vehicle service access flow, in accordance with some aspects.

FIG. 4 is a diagram depicting a second vehicle service access flow 400, in accordance with some aspects. The second vehicle service access flow 400 shows an example flow of vehicles access for services from any service provider or foreign carrier. In this aspect, a foreign carrier for the vehicle may be the service provider for one or more services that the vehicle needs on the road, or a service provider with which the vehicle has no subscription may cover the road segment with one or more services that the vehicle needs. The second vehicle service access flow 400 provides access to those vehicle services.

In this aspect, the vehicle 420 uses an on-demand subscription to services, such as services selected based on need per location or road segment. In operation, the RSUs 414 have information on available services, and the RSUs 414 provide a services advertisement to the vehicle 420. If there are no RSUs 414 on a road segment, the services advertisement can take place directly from one or more MECs 410. In contrast with the first vehicle service access flow 300, second vehicle service access flow 400 may include one or more edge nodes 410. Each edge node 410 may provide a services advertisement to the vehicle 420, and the vehicle may provide a services subscription back to the edge node 410. To provide authentication and authorization for vehicle access to particular services, the vehicle's home subscriber may be used as the trusted party, such as using the authentication and authorization to services access discussed below with respect to FIG. 5.

Figure 5:
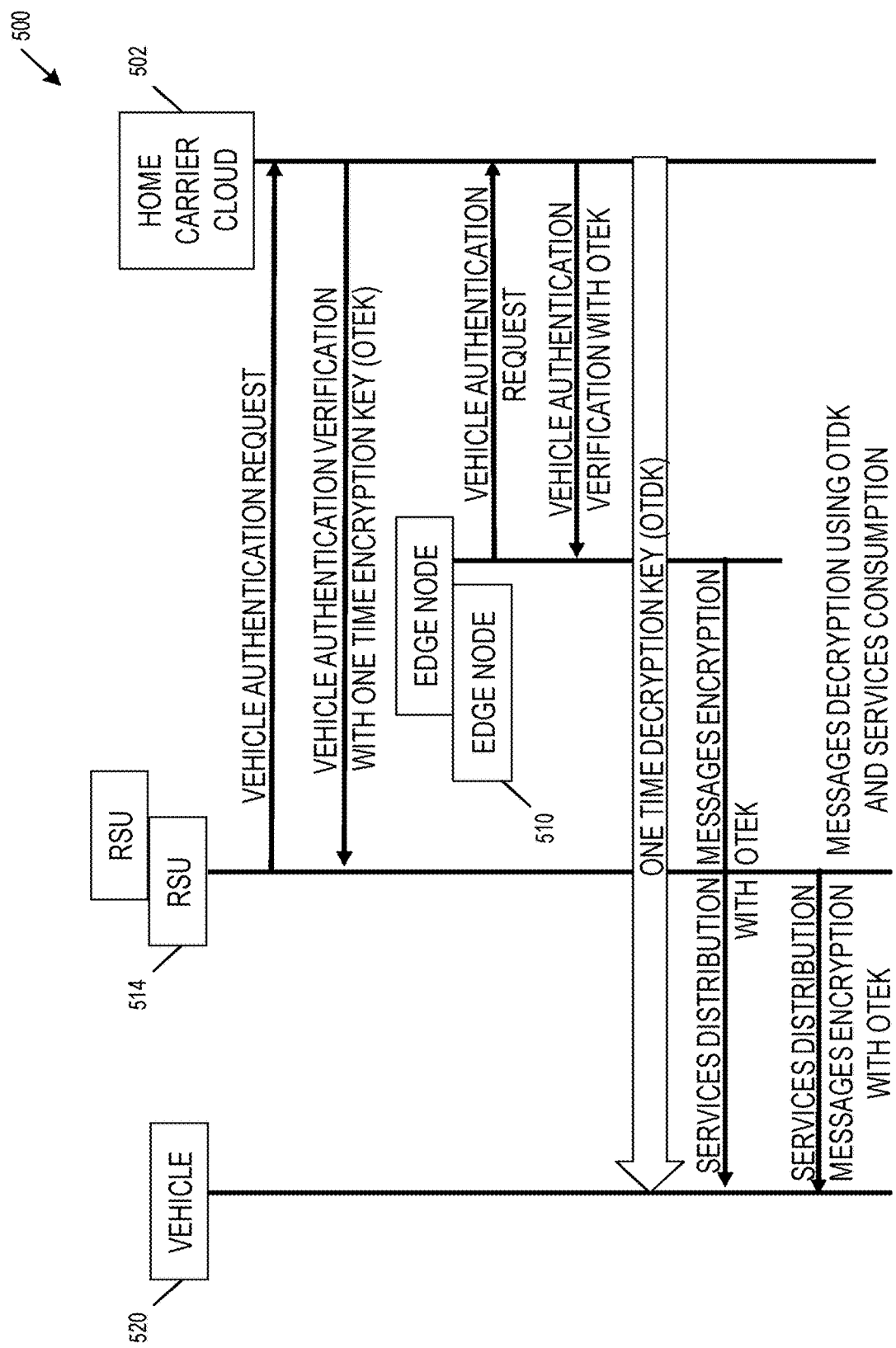
FIG. 5 is a diagram depicting a third vehicle service access flow, in accordance with some aspects.

FIG. 5 is a diagram depicting a third vehicle service access flow 500, in accordance with some aspects. The third vehicle service access flow 500 shows an aspect of handling authentication and authorization to services access. In operation, a vehicle 520 may identify itself on its home carrier subscription during a service request, such as using an international mobile subscriber identity (IMSI). The home carrier 502 may be contacted by the service provider, such as by an RSU 514 or the by an edge node 510, to verify the authentication of the vehicle 520. The home carrier 502 may confirm authentication of the vehicle 520 and separately send to the vehicle 520 a one-time decryption key (OTDK) (e.g., one-time numeric password) for the used service, and may send a one-time encryption key (OTEK) to the service provider serving node, such as to the edge node 510 or to the RSU 514. The service provider serving node may encrypt the service messages or packets being sent to the vehicle using the OTEK, and the vehicle 520 receiving services messages or packets may decrypt them using the OTDK. This allows trusted authentication of the vehicle 520 through its home subscriber and fresh keys for services access on roads.

Figure 6:
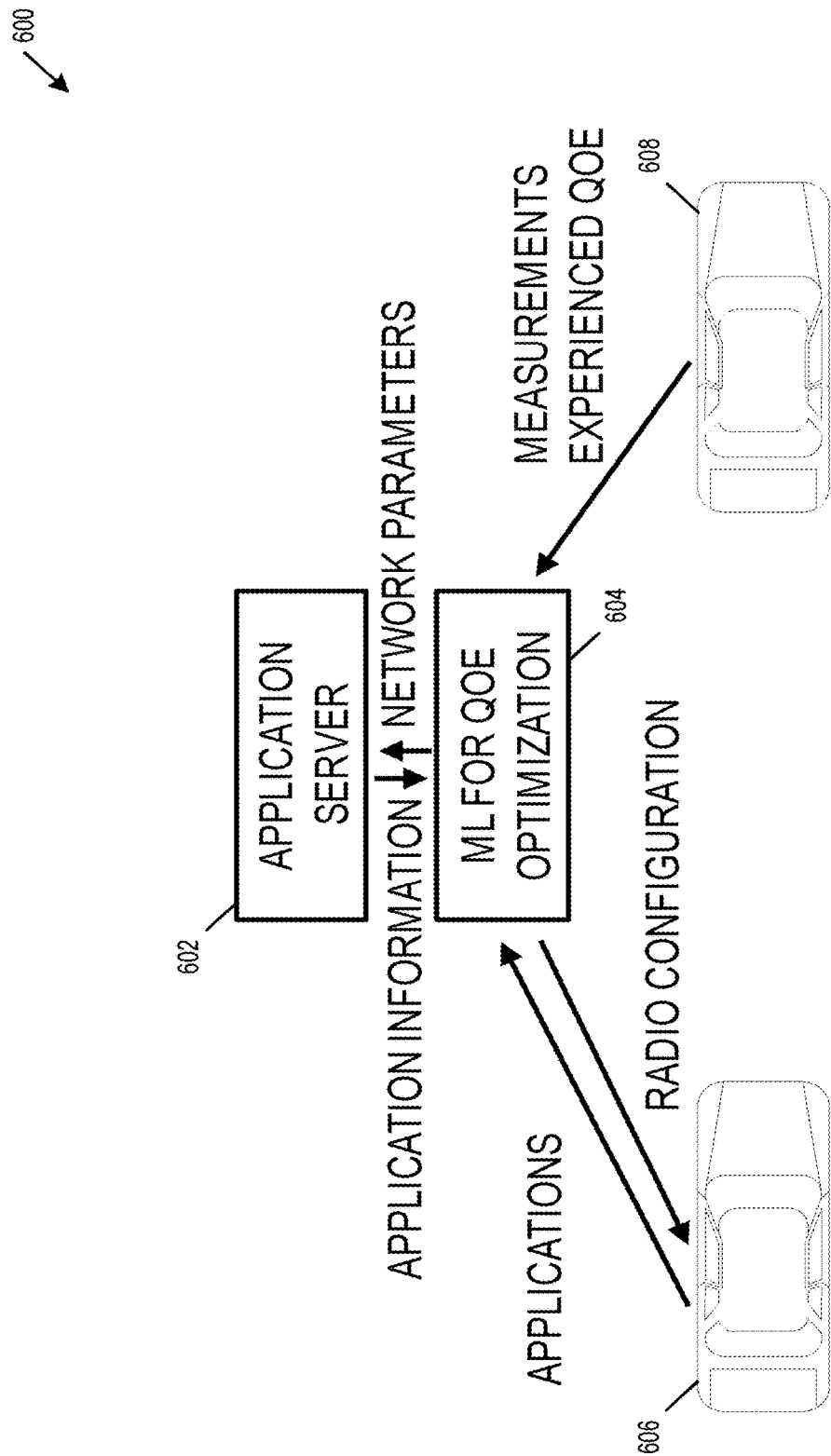
FIG. 6 is a diagram depicting a vehicle communication quality of service (QoS) system, in accordance with some aspects.

FIG. 6 is a diagram depicting a vehicle communication quality of service (QoS) system 600, in accordance with some aspects. The QoS system 600 provides an improved ability to determine and share the communication QoS, which improves the ability of an autonomous vehicle to handle interruptions in network connectivity. For example, a vehicle 606 may experience an interruption of vehicle services due to an abrupt loss of connection, which causes a significant degradation to the quality of experience (QoE) of the users. This degradation may include reducing or preventing access to real-time services for connected and autonomous vehicles, such as preventing real-time updates of maps. Additionally, many real-time autonomous vehicle applications operate based on an estimation of available throughput and latency, together with the service bandwidth consumption needs and latency needs, to provide vehicle service delivery requirements.

The QoS system 600 provides the ability to determine and share the communication QoS with moving autonomous vehicles. In vehicular environments where the cars are moving, particularly where vehicles are moving with a very high speed compared to mobile users, the QoS system 600 provides the ability to determine and share the communication QoS even when the vehicle connectivity to the network may roam frequently between base stations or access points. In an aspect, the QoS system 600 may provide the ability of a vehicle to have advance knowledge of connectivity options, which allows adjustment of applications to minimize or avoid the service interruption. For example, when a vehicle is about to enter a tunnel or otherwise expects limited bandwidth, the communication QoS enables the vehicle to prioritize mapping or safety traffic communication, and to notify the user. The predictive QoS estimation provided by QoS system 600 also improves the ability of a vehicle to meet data connectivity requirements put forward by car manufacturers for various consumer and other vehicle-to-everything (V2X) services. These requirements may include coverage information by different communication technologies, throughput and latency requirements per service type, and other requirements.

To improve the determination and sharing of communication QoS, various predictive QoS adjustments may be used. In an aspect, a predictive QoS adjustment includes crowd-sourcing QoS information. In the crowd-sourcing aspect, multiple vehicles may collect QoS information as they move through an area and provide the QoS information back through a network to an application server. The collected QoS information may include information about coverage, average latency, available throughput from different networks or interfaces, and other QoS information. The QoS information may be collected explicitly by one or more dedicated sensors, or may be collected implicitly by analysis of other available QoS information. The reporting of QoS information from vehicles back to an application server may use high-overhead real-time reporting for information that affects real-time services, such as information for high definition (HD) maps download, traffic information, roadside alerts, and other real-time service information. The reporting of QoS information from vehicles back to an application server may use low-overhead offline reporting at the end of the day, such as for connectivity loss at a particular area all the time, packets drops in known areas, for issues that appear permanent, or for issues that do not have real-time significance. The reporting may be distributed directly from a vehicle to other nearby vehicles using V2V communication, such as communicating QoS information to following cars or to cars approaching the location.

In an aspect, a single vehicle may be designated as a reporting vehicle, and other nearby vehicles associated with the reporting vehicle may receive direct QoS information from the reporting vehicle. The QoS information reported by the cars may be processed at a network edge device. The QoS information may include location-based information, and the location-based information may be used to generate a network QoE map for each region. The QoS map may indicate a level of quality for various locations, areas of interference, or other QoS information. In various aspects, the region size may be identified as a predetermined area, such as an area based on a predetermined number of square kilometers or square miles. The generated network QoE map provides the prediction of QoE for services per region, and may be communicated to vehicles approaching that location or application sources, enabling other vehicles to adjust bandwidth parameters in advance to minimize or eliminate any interruption in service, such as by pre-buffering to cache the data. The generated network QoE map may be refreshed continually by new crowdsourcing.

As shown in FIG. 6, a QoS system 600 may provide a predictive QoS adjustment based on machine learning. The QoS system 600 includes an application server 602 and a machine learning (ML) device 604. The machine learning device 604 may receive information from one or more vehicles 606, which may be collected and provided using crowdsourcing as described above. The information may include information about the performance of one or more autonomous navigation applications, vehicle measurements, QoE experienced at the vehicle 606, information about the users, information about the vehicles, information about vehicle locations, or other QoS information. The information may be correlated as input for training of a QoS machine learning model at the machine learning device 604. The machine learning device 604 may provide network parameters to the application server 602 and receive application information from the application server 602. The machine learning device 604 may receive application information from a vehicle 606 and provide QoS information back to the vehicle 606, such as providing a wireless communication radio configuration instructing the radio to cache information in anticipation of an upcoming service outage. In an example, an application server 602 may work with machine learning device 604 to learn over time that a user during morning commute goes through a low throughput area, and may cause caching of data at an edge network device or pre-buffering at the vehicle device to reduce the effect of traveling through the low throughput area.

In an aspect, the machine learning device 604 may train a QoS machine learning model to identify an output combination of QoS network parameters based on a particular pattern of received QoS information. In another aspect, the machine learning device 604 may train a QoS machine learning model to identify an output wireless communication radio configuration based on an input pattern of received QoS information, based on application information received from the application server 602, based on application information received from the vehicle 606, or based on a real-time link quality experienced by a vehicle modem. In an aspect, the network parameters, application information, radio configuration, and other information may be used to generate a predictive QoS map, and that QoS map may be provided to other vehicles to improve data-based vehicle service performance.

While FIG. 6 shows the machine learning device 604 separate from the application server 602 and the vehicles 606 and 608, the machine learning may be executed on the application server 602 or on one or more of the vehicles 606 and 608. For example, vehicle 606 may include the machine learning device 604 communicatively coupled to the vehicle applications, and vehicle 608 may train its internal QoS machine learning model based on frequent trips, frequently used vehicle services, available and demanded resources, and other information. Information provided by a vehicle's internal QoS machine learning model may be provided back to an application server 602, which may use the information to generate a predictive QoS map. For example, the QoS map may be generated at the application server 602 and provided vehicle 606, which may use the QoS map to identify an area of decreased bandwidth and allocate additional slices of network bandwidth to vehicle 606 to increase the effective bandwidth. This generate of predictive QoS information based on crowdsourcing or based on machine learning may be used to improve network reconfiguration, such as described below with respect to FIG. 7.

Figure 7:
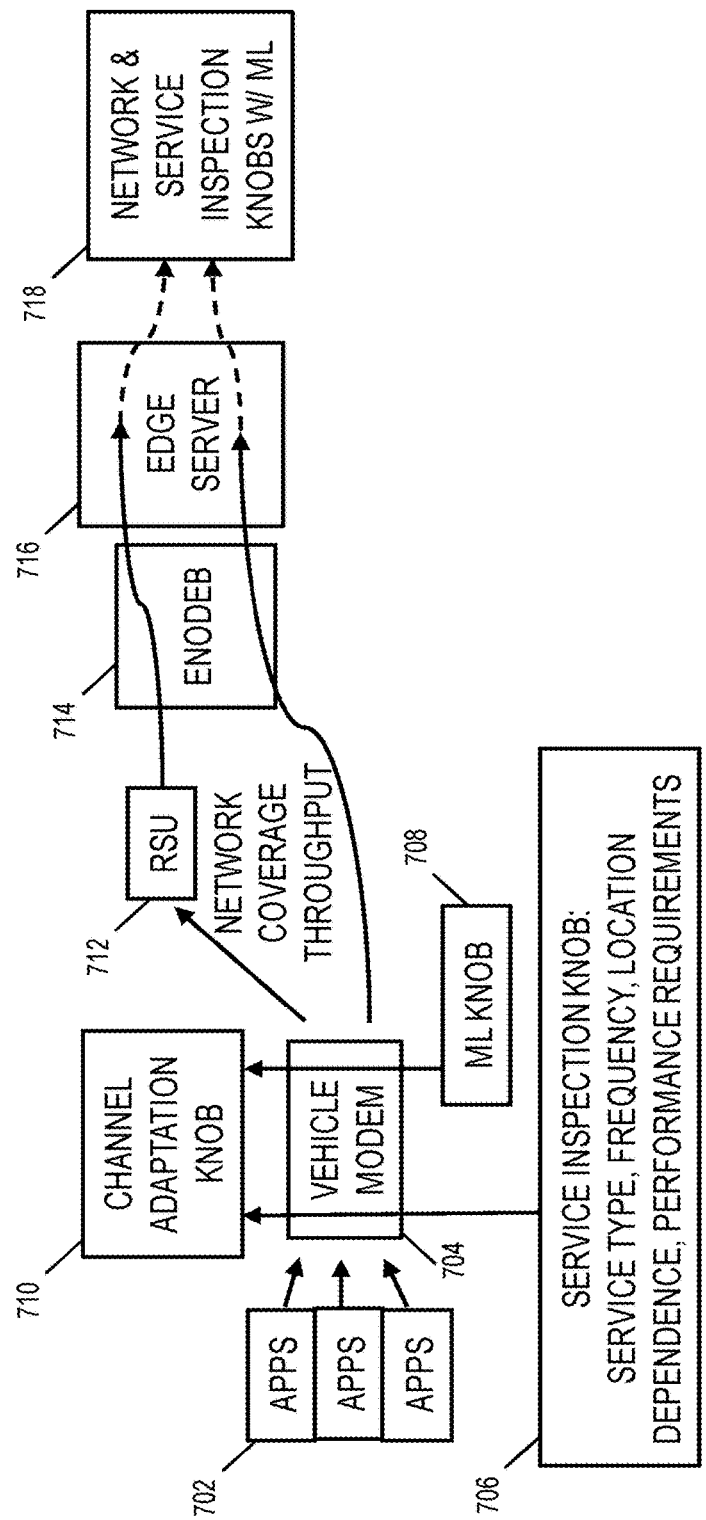
FIG. 7 is a diagram depicting a dynamic network reconfiguration system, in accordance with some aspects.

FIG. 7 is a diagram depicting a dynamic network reconfiguration system 700, in accordance with some aspects. System 700 enables dynamic learning of connected and autonomous vehicles upstream and downstream traffic needs, which may be used to provide dynamic network reconfiguration. System 700 includes one or more vehicle service applications 702 that communicate with a vehicle modem 704. The vehicle modem 704 receives configuration information from a vehicle service inspection knob (e.g., device) 706, such as service type, frequency, location dependence, performance requirements, or other inspection input. The vehicle modem 704 also receives configuration information from a machine learning knob 708, which may be used to modify machine learning parameters such as model training iteration count, model training batch size, and other machine learning parameters. The vehicle modem 704 uses information from the vehicle service inspection knob 706 and the machine learning knob 708 to provide a channel adaptation knob 710. The vehicle modem 704 may provide network coverage throughput through a roadside unit (RSU) 712 and through an eNodeB 714 to a mobile edge computing (MEC) server 716. The vehicle modem 704 may also provide network coverage throughput directly through the eNodeB 714 to the MEC server 716. The MEC server may communicate the network coverage throughput to one or more network and service inspection knobs 718.

The MEC server 716 may be used to receive and store knowledge of network capacity and network loading, which may be used to help data carriers to configure real-time parameters to meet network QoS requirements. The MEC server 716 and network and service inspection knobs 718 may use machine learning to receive and process dynamic information available about the vehicle service needs, consumption rate of services per road segment and time of the day, density of services consumers on roads for vehicles and roadside units, and dynamic information from vehicles. The MEC server 716 and network and service inspection knobs 718 may generate dynamic information describing the vehicle service needs using deep packet inspection or intelligent traffic classification techniques applied to data provided from the vehicle modem 704. For example, the MEC server 716 and network and service inspection knobs 718 may examine in real-time the traffic types and vehicle service needs, and may adapt network bandwidth slicing (e.g., allocation) for each vehicle service type in real-time. Dynamic information on the service needs may also be available via an interface to the application or via the vehicles, such as using techniques for creation of predictive QoS map based on crowdsourcing and machine learning described above with respect to FIG. 6. The predictive QoS map generation and the dynamic network reconfiguration may be used separately, though using both together would improve or maximize the improvements to performance of data-based vehicle services.

Figure 8:
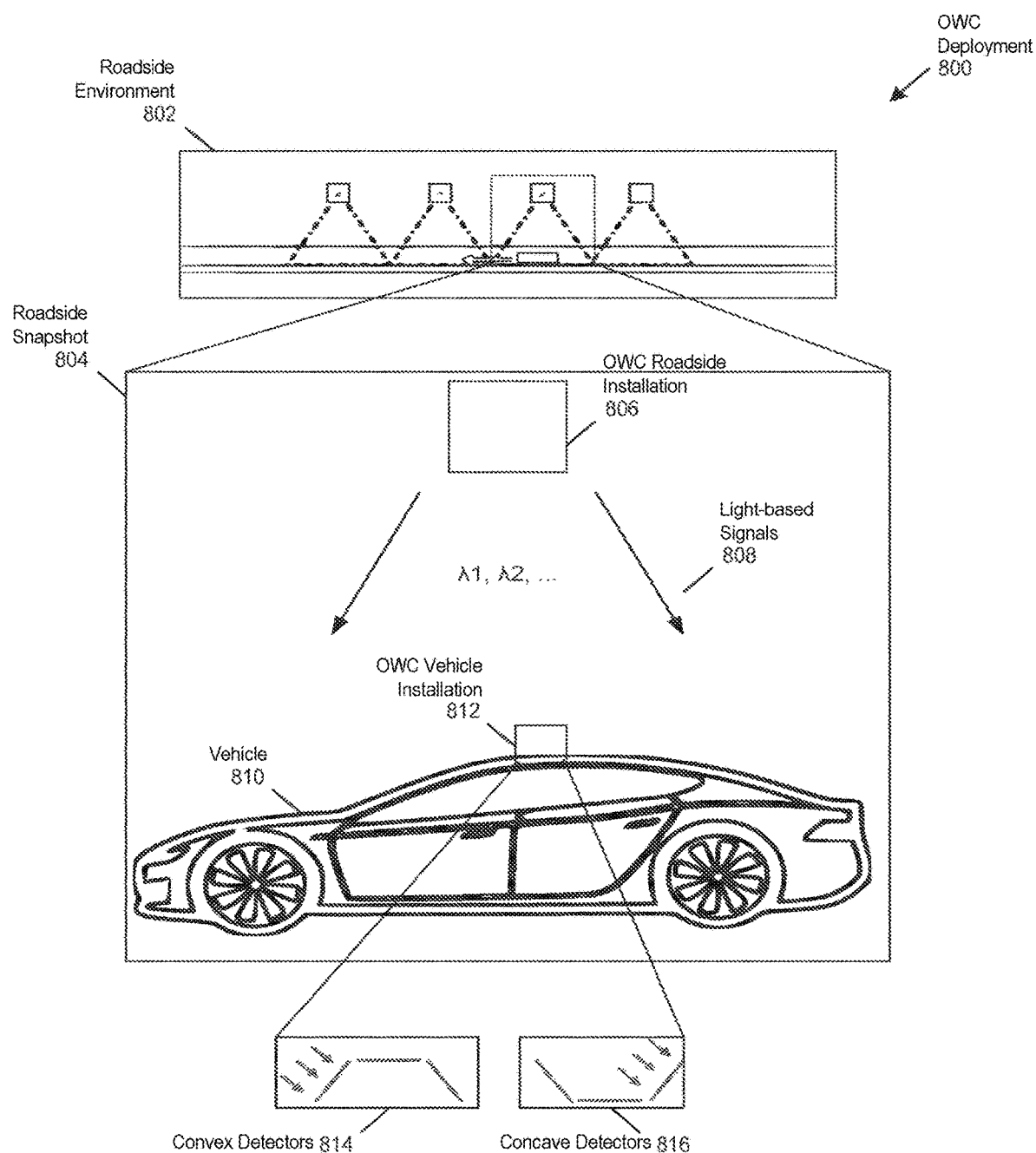
FIG. 8 is a diagram depicting an optical wireless communication (OWC) deployment, in accordance with some aspects.

FIG. 8 is a diagram depicting an OWC deployment 800, in accordance with some aspects. The OWC deployment 800 provides technical solutions for the technical problems facing high volume data upload and download between autonomous vehicles and cloud-based data services. In some aspects, optical wireless communication (OWC) provides increased data throughput and reduced complexity, such as may be beneficial for short-range high-mobility wireless communications. These OWC solutions provide wireless access without requiring expensive wireless data packages and reduces or eliminates interference with RF technologies such as Wi-Fi and WiGig. Table 1 summarizes how OWC outperforms WiGig:

TABLE 1

| OWC Performance Vs. Wi-Fi | | |
|---|---|---|
| | OWC (Infrared) | WiGig |
| Capacity Per Channel | 10, 25, 50 Gbit/s<br>Up to 100 Gbit/s in development | <7 Gbit/s |
| Carrier Frequency and Average Bandwidth | Center: 850 nm, 1310 nm, 1550 nm.<br>BW Ex: 1460-1625 (S + C + L) width 20.9 THz<br>Single OWC alignment for achieving duplex/multi-channel super high BW, i.e., 1.1 Tbit/s (45λ * 25 Gbit/s) | Center: 60 GHz<br>BW: 7 GHz<br>Big data paint point |
| Interference | Not with RF; Multi-wavelength beams interference are manageable | Environment, existing RF signals/equipment |

In various aspects, these OWC solutions can be leveraged when the vehicle is proximate to roadside units equipped with OWC in city roads or highways. These solutions may be deployed in the transportation infrastructure (e.g., traffic lights, light posts, vehicle charging stations) to communicate with vehicles. Depending on the infrastructure implementation, these OWC solutions may include a fixed point-to-point OWC configuration (e.g., for charging station infrastructure) or a fixed point to moving point OWC configuration (e.g., for traffic light or light posts infrastructures).

The OWC configuration 800 includes an example OWC solution for a fixed point to moving point OWC configuration, such as may be useful in the case of download of a high volume data from the cloud to a vehicle. In an aspect, a roadside environment 802 includes multiple roadside units to provide continuous coverage while a vehicle is moving. In an example, the transmitters may be installed in roadside barriers, which may provide continuous coverage even at high speeds.

Roadside snapshot 804 shows an example of this OWC solution. More specifically, the roadside snapshot 804 shows a vehicle 810 communicating with an OWC roadside installation 806 within roadside environment 802. The OWC roadside installation 804 includes a light source 806 that emits light-based signals 808. The light-based signals 808 may use one or more wavelengths, where the wavelengths may be selected based on wavelength transmission effectiveness (e.g., minimization of signal-to-noise ratio (SNR) levels), selected to provide multiple simultaneous channels of communication, or selected based on other criteria. The light-based signals 808 may be received by an OWC vehicle installation 812 installed on the vehicle 810. Each of the OWC roadside installation 806 and the OWC vehicle installation 812 may include a light source transmitter and a photo detector receiver, such as to provide simultaneous uploading and downloading.

Each OWC transmitter may be used to generate a light shower (e.g., an area of illumination). The light shower provides a substantially uniform light intensity at a predetermined distance, such as using one or more focusing lenses described below. The predetermined distance for the uniform light intensity may include a range approximating a distance between the height of the OWC roadside installation 806 and an expected average height of the OWC vehicle installation 812. In an example, the predetermined distance may provide substantially uniform light intensity for a range between three meters and four meters, though other predetermined distances and ranges may be used. By designing these OWC transmitters to provide this substantially uniform light intensity, the receiver on the OWC vehicle installation 812 receives substantially consistent power levels while within the light cone (e.g., within the broadcast area of the OWC roadside installation 806). These substantially consistent power levels provide substantially consistent SNR and improve the ability of the system to provide high bandwidth operation. In an aspect, this substantially uniform intensity light shower is provided by a collimated fiber output from the transmitter passing through an optical front-end customized for the respective OWC installation. Outputs of multiple transmitters with different wavelength may be combined in the fiber (e.g., via a wavelength combiner). Using these features, the transmitter may provide the ability to use the same optical front-end while providing Dense Wave Division Multiplexing (DWDM). This DWDM may include multiplexed optical signals, such as optical signals multiplexed within the 1550 nm band to leverage the capabilities and cost of Erbium-doped fiber amplifiers (EDFAs), which are effective for wavelengths between approximately 1525-1565 nm (C band), or 1570-1610 nm (L band). The use of DWDM OWC may further increase bandwidth. In an example, the DWDM OWC may provide a bandwidth of 45×25 Gbps=1.1 Tbps or higher. In some aspects, the data may be modulated using on-off keying with Manchester encoding.

In some aspects, the OWC receiver may include focusing optics and a photo detector receiver. The focusing optics may be used to focus light, such as focusing light directly onto the photo detector or focusing light onto an optical fiber that brings the signal to the photo detector. An OWC receiver may include one or more detectors, and the detector with the highest strength may be selected based on which combination provides the best signal (e.g., highest power level, lowest SNR). An OWC receiver may further include multiple detectors arranged relative to each other in various configurations, such as convex detectors 814 or concave detectors 816. These nonplanar configurations may be used to increase the overall field of view of each receiver unit. Each receiver or detector may be mechanically actuated, such as to track a receiver location or an incoming beam direction to improve or maximize data coupling (e.g., improve or maximize SNR). In an aspect, the tracking of receiver location or beam direction may be based on current knowledge of receiver location and a priori knowledge of transmitter location (e.g., offline download of transmitter locations). Using these locations, the OWC receiver or receiver optics may be adjusted to point toward the transmitter location. In an aspect, the data coupling may be improved or maximized by mechanically manipulating one or all of the receiver optics, detector, or fiber, such as to obtain the highest signal. Signal processing techniques may be employed to create a closed loop feedback directly from a detector, which may be used to search and align to the optimal receiving position automatically for the receiver and or individual detectors in the receiver. By using an analysis based on an assumption of a strongly Rician channel (e.g., channel with strong line-of-sight component), the complexity of the decision feedback equalizer may be reduced to eliminate post-cursor inter-symbol interference. For aspects using DWDM, a fiber wavelength filter may be used to separate wavelengths and bring them to individual receivers or detectors.

Figure 9:
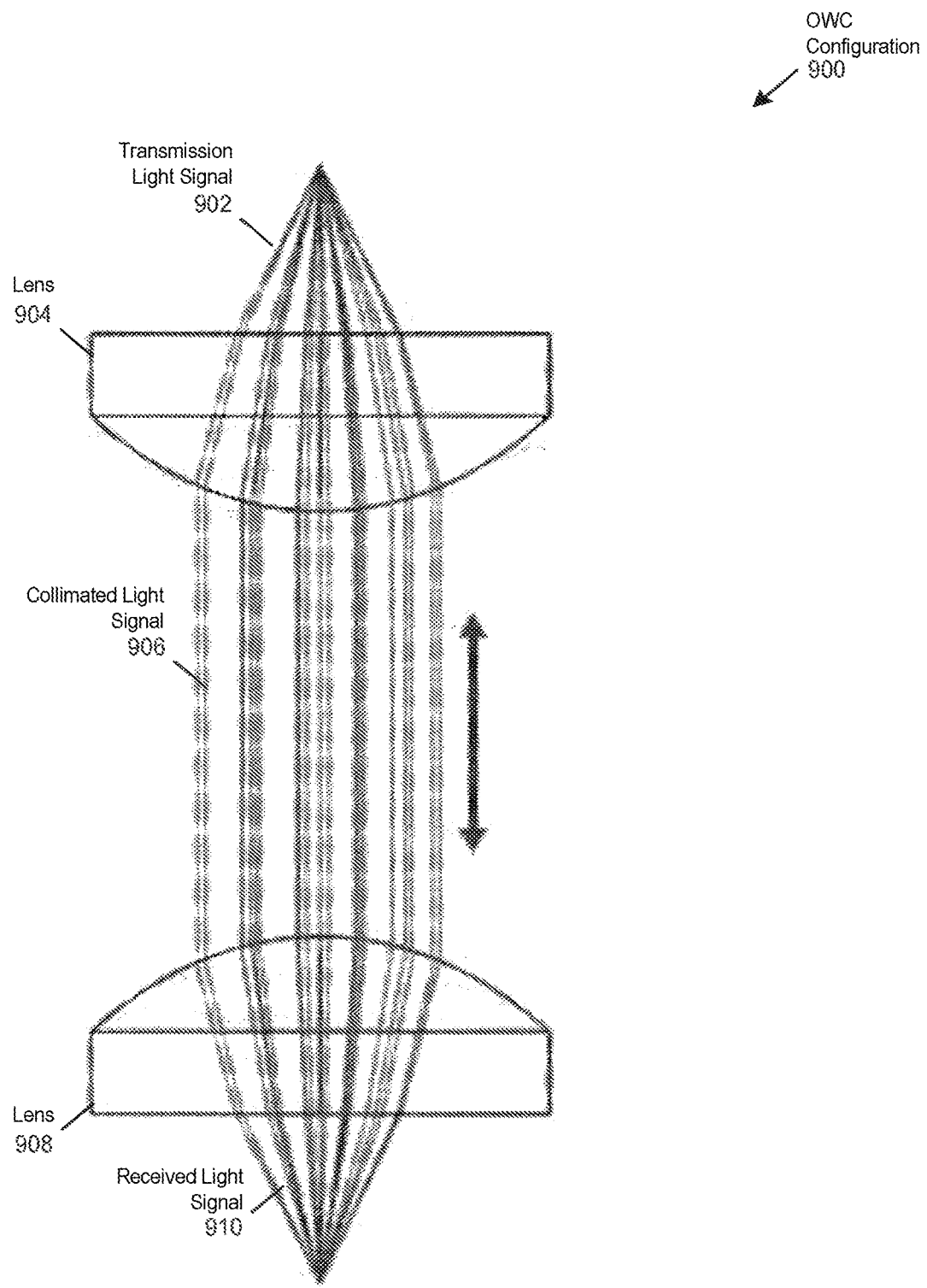
FIG. 9 is a diagram depicting a collimated OWC configuration, in accordance with some aspects.

FIG. 9 is a diagram depicting a collimated OWC configuration 900, in accordance with some aspects. Fixed point-to-point OWC may provide robust and high-bandwidth download and upload links, such as by reducing or eliminating the effects of contact contamination failures. As shown in the collimated OWC configuration 900, a first lens 904 may be used to collimate a transmission light signal 902 into a collimated light signal 906, which may be received by a second lens 908 and focus the received light signal 910 onto a receiver. Each of the first lens 904 and the second lens 908 may include a substantially aberration-free collimation lens, which may provide substantially 100% coupling for an OWC fixed point-to-point link Each of the first lens 904 and the second lens 908 may be used to collimate or focus light, supporting bi-directional communication. Bi-directional communication may be further improved by using an optical circulator to separate transmitting and receiving signal on each side. Additionally, this OWC configuration 900 provides a simplified upgrade path to a higher bandwidth solution (e.g., a multi-wavelength MUX), such as by replacing transceiver or receiver components and reusing the fixed point-to-point collimated alignment OWC configuration 900.

Figure 10:
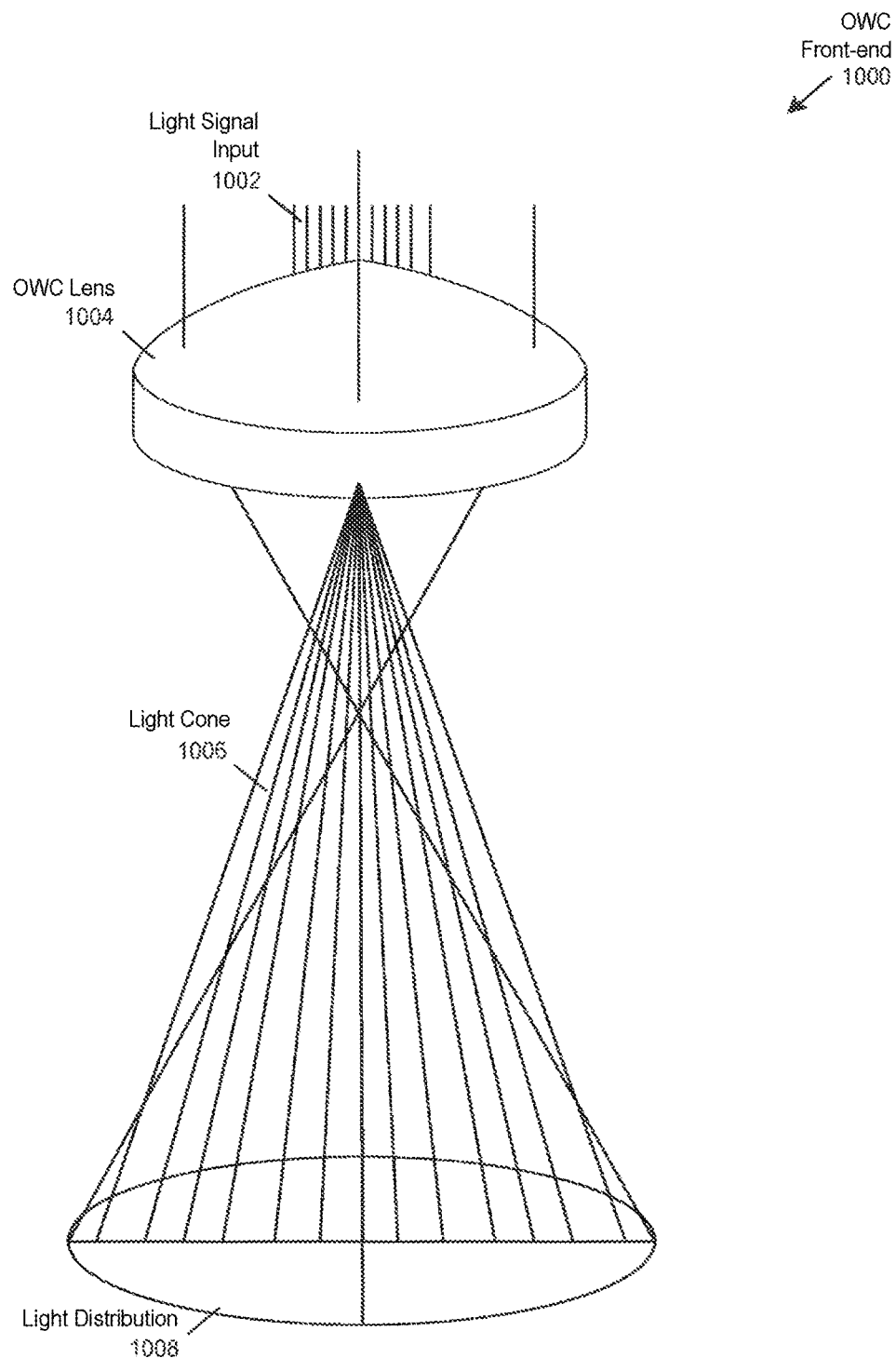
FIG. 10 is a diagram depicting an OWC customized optical front-end design, in accordance with some aspects.

FIG. 10 is a diagram depicting an OWC customized optical front-end design 1000, in accordance with some aspects. A light signal input 1002 may be fed to a customized OWC lens 1004. The light signal input 1002 may include light with a collimated Gaussian intensity profile (e.g., brighter center, illumination following a bell-shaped plot). The customized OWC lens 1004 may refocus the light signal input 1002 through a conical light cone 1006 onto a substantially planar and substantially uniform intensity light distribution 1008. The customized OWC lens 1004 generates this light distribution 1008 using the aspherical surface property of the lens, focusing the collimated beam at different focal points near the lens in order to redistribute the intensity in a substantially planar area at a predetermined designed distance. This customized OWC lens 1004 may be designed for various areas and distances, such as using lens modelling software to identify a uniformity target and to optimize the lens aspherical coefficients. While FIG. 10 shows a substantially uniform light distribution 1008 that is circular or elliptical, other planar shapes may be selected for various environments and applications. For example, the OWC lens 1004 may be designed for various conical angles, such as to provide an elliptical shape that is longer in a vehicle travel direction and narrower in a direction perpendicular to vehicle travel. These design selections may be used to further improve or maximize SNR and overall system power efficiency.

Figure 11A:
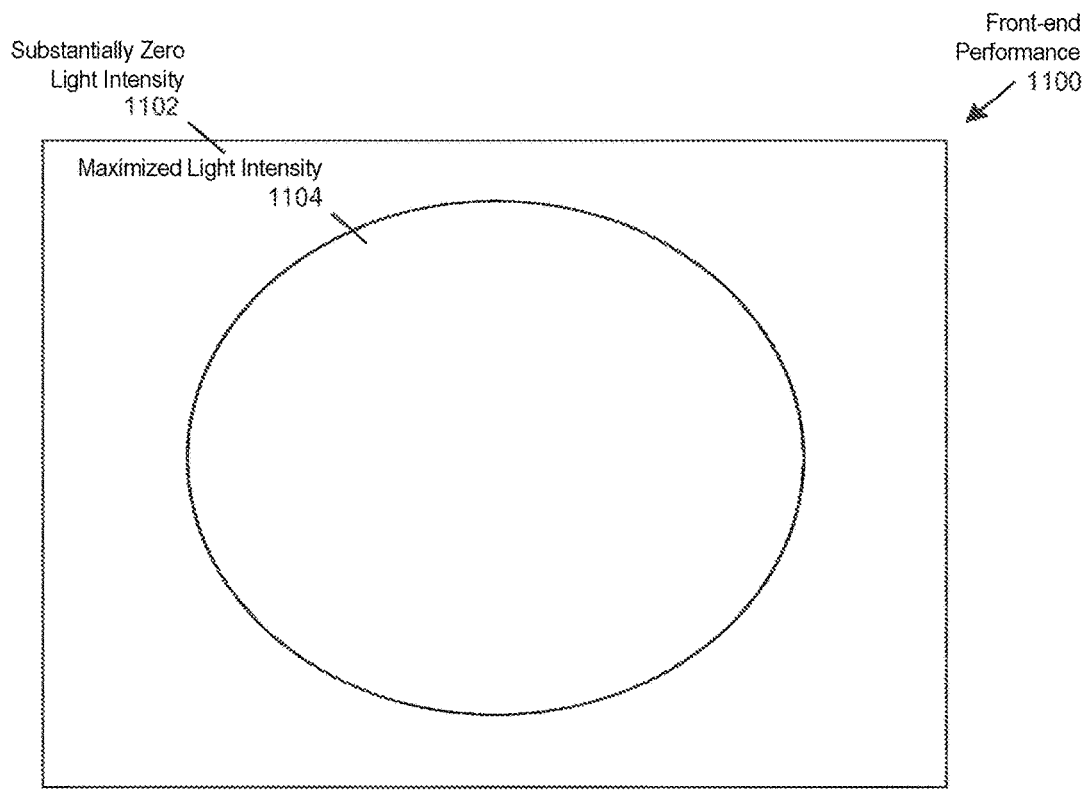
FIGS. 11A and 11B are diagrams of customized optical front-end performance, in accordance with some aspects.
Figure 11B:
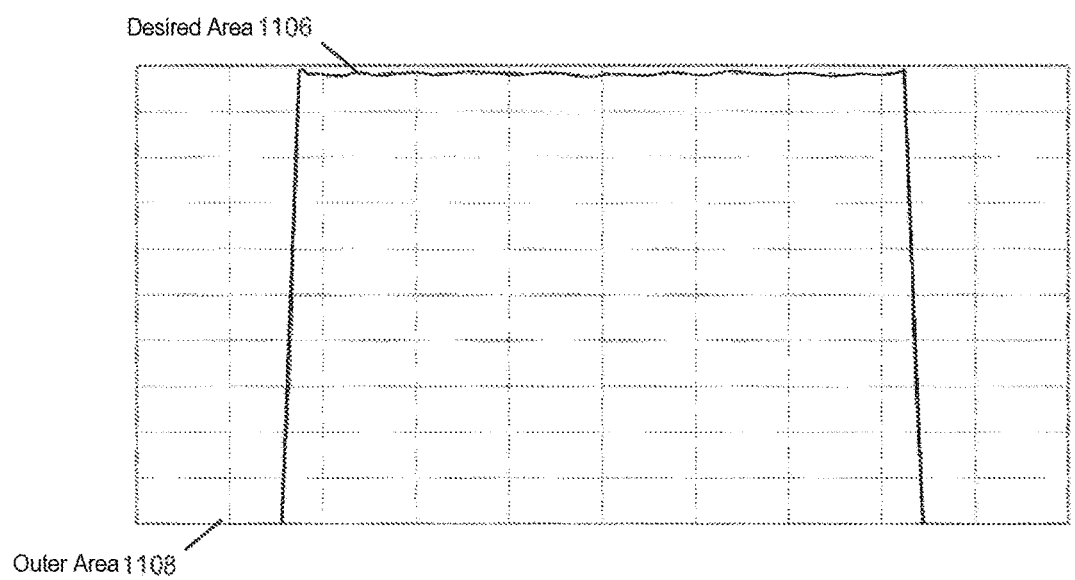

FIGS. 11A and 11B are diagrams of customized optical front-end performance 1100, in accordance with some aspects. FIG. 11A shows an example of substantially uniform intensity in a two-dimensional plot. In particular, the light intensity is maximized and substantially uniform within circle 1104, but substantially zero intensity in the outer area 1102. FIG. 11B shows an example of substantially uniform intensity in a one-dimensional plot. In particular, the light intensity is maximized and substantially uniform within the desired area 1106, but substantially zero intensity in the outer area 1108. In an example, the center of the two-dimensional plot in FIG. 11A may correspond to the center line of the one-dimensional plot shown in FIG. 11B. By using modeling in designing the OWC customized optical front-end, the optical front-end may provide a substantially uniform intensity for a predetermined distance, and may also provide a substantially uniform intensity for a range of distances. This ability to provide a substantially uniform intensity for a range of distances further improves or maximizes SNR and overall system power efficiency for the variations in communication ranges specific to these proposed infrastructure and vehicle communication applications.

These light intensity patterns and optical front-end design may be used to detect the use of the OWC aspects described herein. For example, the specific lens configurations described above may be detected through system analysis (e.g., reverse engineering). Additionally, the wavelength of the OWC light signals would likely include light within the near-IR spectrum range, and this transmitter output pattern may be detected using an IR card or beam scanner.

Figure 12:
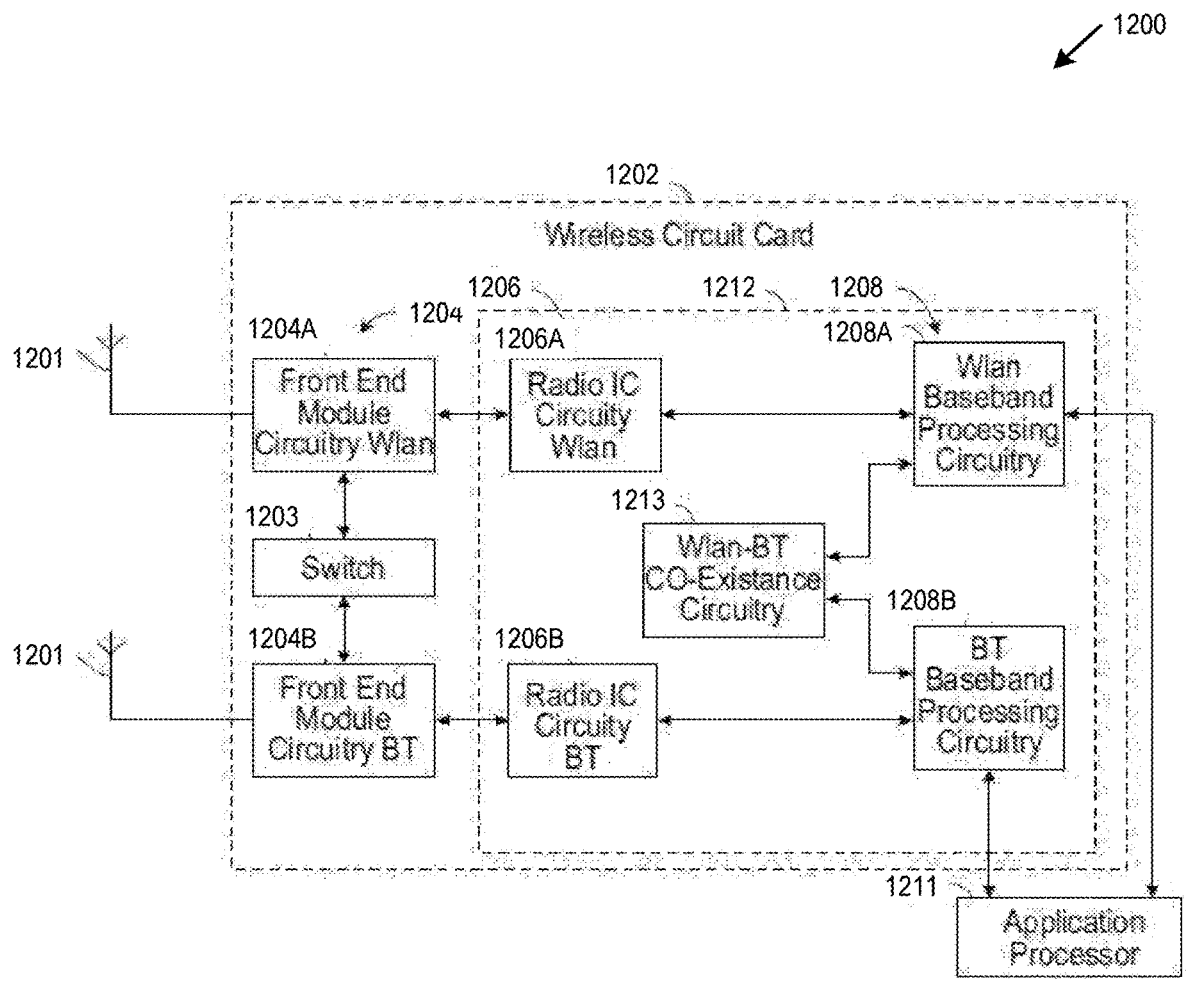
FIG. 12 is a block diagram of a radio architecture in accordance with some aspects.

FIG. 12 is a block diagram of a radio architecture 1200 in accordance with some aspects. Radio architecture 1200 may be used to provide radio communication, such as for the heterogeneous infrastructure 100, the vehicle QoS system 600, or other systems described herein. Radio architecture 1200 may include radio front-end module (FEM) circuitry 1204, radio IC circuitry 1206 and baseband processing circuitry 1208. Radio architecture 1200 as shown includes both Wireless Local Area Network (WLAN) functionality and Bluetooth (BT) functionality although aspects are not so limited. In this disclosure, "WLAN" and "Wi-Fi" are used interchangeably.

FEM circuitry 1204 may include a WLAN or Wi-Fi FEM circuitry 1204A and a Bluetooth (BT) FEM circuitry 1204B. The WLAN FEM circuitry 1204A may include a receive signal path comprising circuitry configured to operate on WLAN RF signals received from one or more antennas 1201, to amplify the received signals and to provide the amplified versions of the received signals to the WLAN radio IC circuitry 1206A for further processing. The BT FEM circuitry 1204B may include a receive signal path which may include circuitry configured to operate on BT RF signals received from one or more antennas 1201, to amplify the received signals and to provide the amplified versions of the received signals to the BT radio IC circuitry 1206B for further processing. FEM circuitry 1204A may also include a transmit signal path which may include circuitry configured to amplify WLAN signals provided by the radio IC circuitry 1206A for wireless transmission over a wireless communication network by one or more of the antennas 1201. In addition, FEM circuitry 1204B may also include a transmit signal path which may include circuitry configured to amplify BT signals provided by the radio IC circuitry 1206B for wireless transmission by the one or more antennas. In the aspect of FIG. 12, although FEM circuitry 1204A and FEM circuitry 1204B are shown as being distinct from one another, aspects are not so limited, and include within their scope the use of additional FEM circuitry (not shown) that includes a transmit path or a receive path for both WLAN and BT signals, or the use of one or more FEM circuitries where at least some of the FEM circuitries share transmit or receive signal paths for both WLAN and BT signals.

Radio IC circuitry 1206 as shown may include WLAN radio IC circuitry 1206A and BT radio IC circuitry 1206B. The WLAN radio IC circuitry 1206A may include a receive signal path which may include circuitry to down-convert WLAN RF signals received from the FEM circuitry 1204A and provide baseband signals to WLAN baseband processing circuitry 1208A. BT radio IC circuitry 1206B may in turn include a receive signal path which may include circuitry to down-convert BT RF signals received from the FEM circuitry 1204B and provide baseband signals to BT baseband processing circuitry 1208B. WLAN radio IC circuitry 1206A may also include a transmit signal path which may include circuitry to up-convert WLAN baseband signals provided by the WLAN baseband processing circuitry 1208A and provide WLAN RF output signals to the FEM circuitry 1204A for subsequent wireless transmission by the one or more antennas 1201. BT radio IC circuitry 1206B may also include a transmit signal path which may include circuitry to up-convert BT baseband signals provided by the BT baseband processing circuitry 1208B and provide BT RF output signals to the FEM circuitry 1204B for subsequent wireless transmission by the one or more antennas 1201. In the aspect of FIG. 12, although radio IC circuitries 1206A and 1206B are shown as being distinct from one another, aspects are not so limited, and include within their scope the use of a radio IC circuitry (not shown) that includes a transmit signal path or a receive signal path for both WLAN and BT signals, or the use of one or more radio IC circuitries where at least some of the radio IC circuitries share transmit or receive signal paths for both WLAN and BT signals.

Baseband processing circuity 1208 may include a WLAN baseband processing circuitry 1208A and a BT baseband processing circuitry 1208B. The WLAN baseband processing circuitry 1208A may include a memory, such as, for example, a set of RAM arrays in a Fast Fourier Transform or Inverse Fast Fourier Transform block (not shown) of the WLAN baseband processing circuitry 1208A. Each of the WLAN baseband circuitry 1208A and the BT baseband circuitry 1208B may further include one or more processors and control logic to process the signals received from the corresponding WLAN or BT receive signal path of the radio IC circuitry 1206, and to also generate corresponding WLAN or BT baseband signals for the transmit signal path of the radio IC circuitry 1206. Each of the baseband processing circuitries 1208A and 1208B may further include physical layer (PHY) and medium access control layer (MAC) circuitry, and may further interface with application processor 1210 for generation and processing of the baseband signals and for controlling operations of the radio IC circuitry 1206.

Referring still to FIG. 12, according to the shown aspect, WLAN-BT coexistence circuitry 1213 may include logic providing an interface between the WLAN baseband circuitry 1208A and the BT baseband circuitry 1208B to enable use cases requiring WLAN and BT coexistence. In addition, a switch 1203 may be provided between the WLAN FEM circuitry 1204A and the BT FEM circuitry 1204B to allow switching between the WLAN and BT radios according to application needs. In addition, although the antennas 1201 are depicted as being respectively connected to the WLAN FEM circuitry 1204A and the BT FEM circuitry 1204B, aspects include within their scope the sharing of one or more antennas as between the WLAN and BT FEMs, or the provision of more than one antenna connected to each of FEM circuitry 1204A or FEM circuitry 1204B.

In some aspects, the front-end module circuitry 1204, the radio IC circuitry 1206, and baseband processing circuitry 1208 may be provided on a single radio card, such as wireless radio card 1202. In some other aspects, the one or more antennas 1201, the FEM circuitry 1204 and the radio IC circuitry 1206 may be provided on a single radio card. In some other aspects, the radio IC circuitry 1206 and the baseband processing circuitry 1208 may be provided on a single chip or integrated circuit (IC), such as IC 1212.

In some aspects, the wireless radio card 1202 may include a WLAN radio card and may be configured for Wi-Fi communications, although the scope of the aspects is not limited in this respect. In some of these aspects, the radio architecture 1200 may be configured to receive and transmit orthogonal frequency division multiplexed (OFDM) or orthogonal frequency division multiple access (OFDMA) communication signals over a multicarrier communication channel. The OFDM or OFDMA signals may comprise a plurality of orthogonal subcarriers.

In some of these multicarrier aspects, radio architecture 1200 may be part of a Wi-Fi communication station (STA) such as a wireless access point (AP), a base station or a mobile device including a Wi-Fi device. In some of these aspects, radio architecture 1200 may be configured to transmit and receive signals in accordance with specific communication standards or protocols, such as any of the Institute of Electrical and Electronics Engineers (IEEE) standards including, 802.11n-2009, IEEE 802.11-2012, 802.11n-2009, 802.11ac, or 802.11ax standards or proposed specifications for WLANs, although the scope of aspects is not limited in this respect. Radio architecture 1200 may also be suitable to transmit or receive communications in accordance with other techniques and standards.

In some aspects, the radio architecture 1200 may be configured for high-efficiency (HE) Wi-Fi (HEW) communications in accordance with the IEEE 802.11ax standard. In these aspects, the radio architecture 1200 may be configured to communicate in accordance with an OFDMA technique, although the scope of the aspects is not limited in this respect.

In some other aspects, the radio architecture 1200 may be configured to transmit and receive signals transmitted using one or more other modulation techniques such as spread spectrum modulation (e.g., direct sequence code division multiple access (DS-CDMA) or frequency hopping code division multiple access (FH-CDMA)), time-division multiplexing (TDM) modulation, or frequency-division multiplexing (FDM) modulation, although the scope of the aspects is not limited in this respect.

Figure 13:
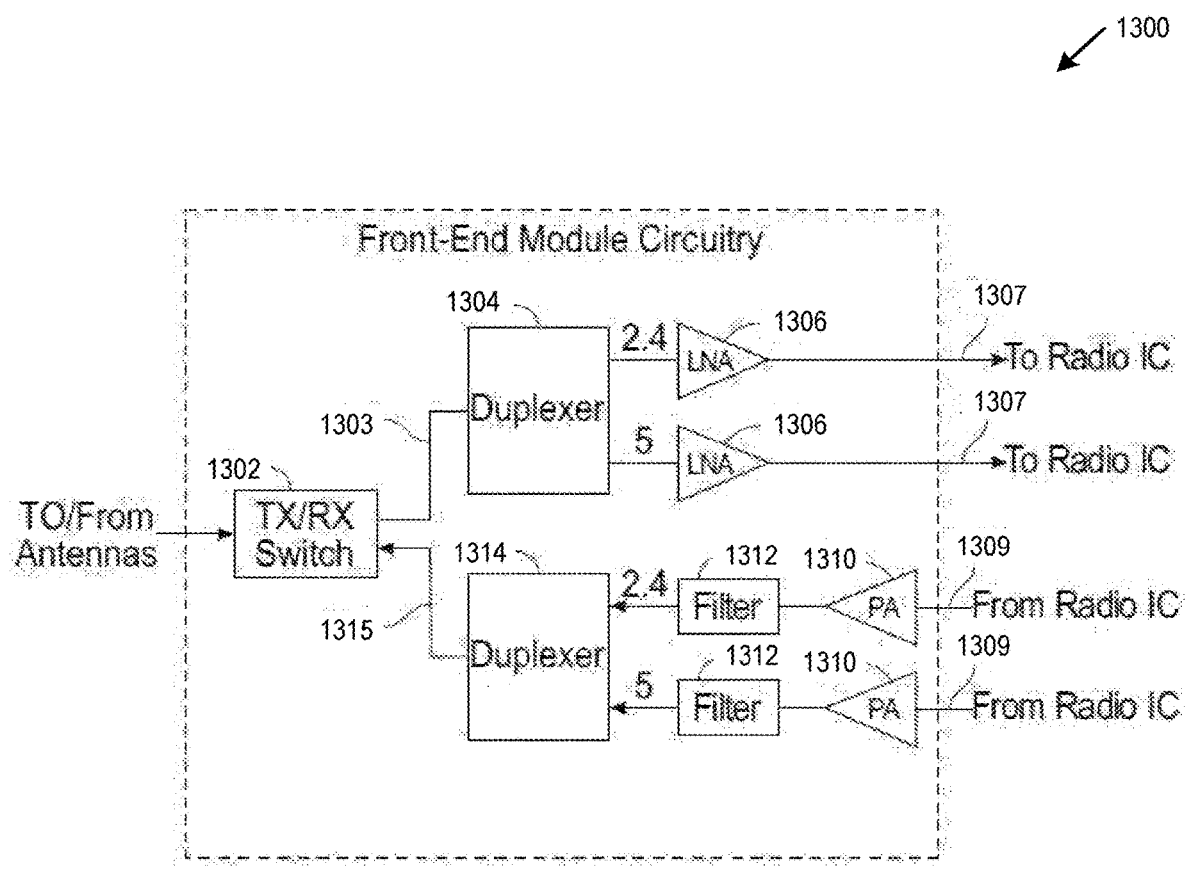
FIG. 13 illustrates a front-end module circuitry for use in the radio architecture of FIG. 12 in accordance with some aspects.

In some aspects, as further shown in FIG. 12, the BT baseband circuitry 1208B may be compliant with a Bluetooth (BT) connectivity standard such as Bluetooth, Bluetooth 4.0 or Bluetooth 5.0, or any other iteration of the Bluetooth Standard. In aspects that include BT functionality as shown for example in FIG. 12, the radio architecture 1200 may be configured to establish a BT synchronous connection oriented (SCO) link and or a BT low energy (BT LE) link In some of the aspects that include a SCO functionality, the radio architecture 1200 may be configured to establish an extended SCO (eSCO) link for BT communications, although the scope of the aspects is not limited in this respect. In some of these aspects that include a BT functionality, the radio architecture may be configured to engage in a BT Asynchronous Connection-Less (ACL) communications, although the scope of the aspects is not limited in this respect. In some aspects, as shown in FIG. 12, the functions of a BT radio card and WLAN radio card may be combined on a single wireless radio card, such as single wireless radio card 1202, although aspects are not so limited, and include within their scope discrete WLAN and BT radio cards FIG. 13 illustrates FEM circuitry 1300 in accordance with some aspects. The FEM circuitry 1300 is one example of circuitry that may be suitable for use as the WLAN or BT FEM circuitry 1204A or 1204B (FIG. 12), although other circuitry configurations may also be suitable.

In some aspects, the FEM circuitry 1300 may include a TX/RX switch 1302 to switch between transmit mode and receive mode operation. The FEM circuitry 1300 may include a receive signal path and a transmit signal path. The receive signal path of the FEM circuitry 1300 may include a low-noise amplifier (LNA) 1306 to amplify received RF signals 1303 and provide the amplified received RF signals 1307 as an output (e.g., to the radio IC circuitry 1400 (FIG. 14)). The transmit signal path of the FEM circuitry 1300 may include a power amplifier (PA) to amplify input RF signals 1309 (e.g., provided by the radio IC circuitry 1400), and one or more filters 1312, such as band-pass filters (BPFs), low-pass filters (LPFs) or other types of filters, to generate RF signals 1315 for subsequent transmission (e.g., by one or more of the antennas 1201 (FIG. 12)).

In some dual-mode aspects for Wi-Fi communication, the FEM circuitry 1300 may be configured to operate in either the 2.4 GHz frequency spectrum or the 5 GHz frequency spectrum. In these aspects, the receive signal path of the FEM circuitry 1300 may include a receive signal path duplexer 1304 to separate the signals from each spectrum as well as provide a separate LNA 1306 for each spectrum as shown. In these aspects, the transmit signal path of the FEM circuitry 1300 may also include a power amplifier 1310 and a filter 1312, such as a BPF, a LPF or another type of filter for each frequency spectrum and a transmit signal path duplexer 1314 to provide the signals of one of the different spectrums onto a single transmit path for subsequent transmission by the one or more of the antennas 1201 (FIG. 12). In some aspects, BT communications may utilize the 2.4 GHZ signal paths and may utilize the same FEM circuitry 1300 as the one used for WLAN communications.

Figure 14:
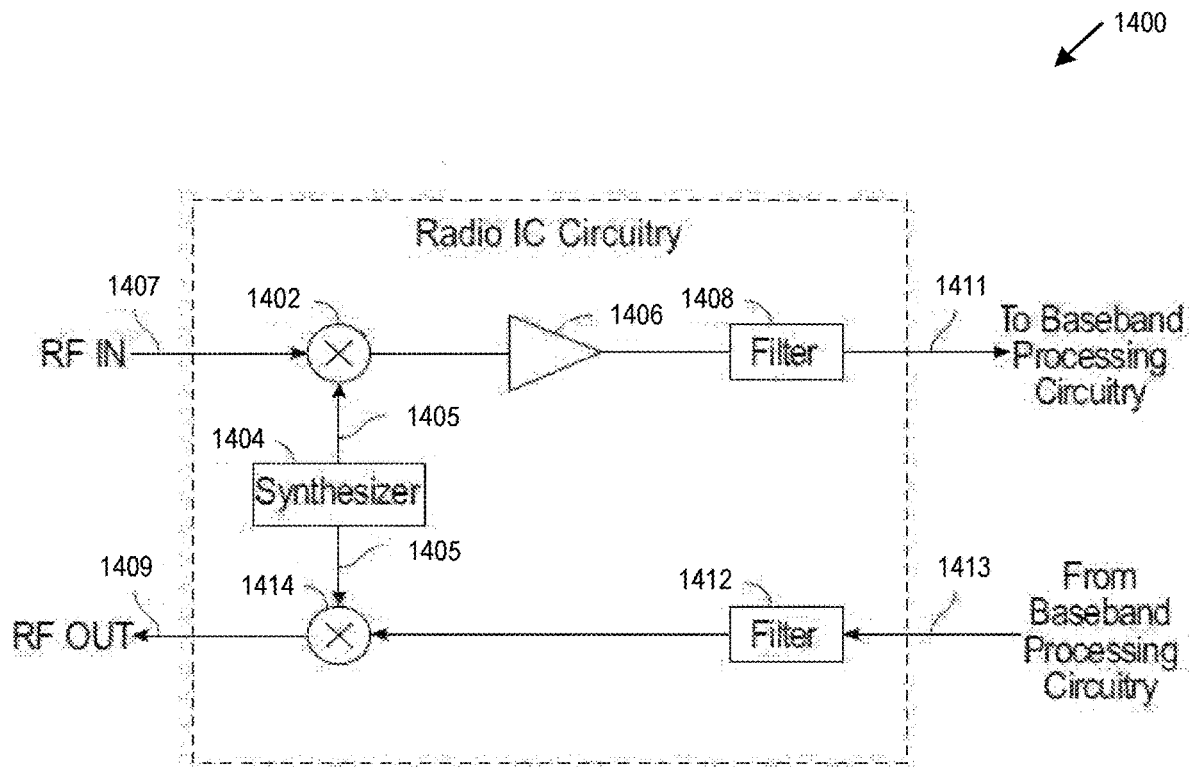
FIG. 14 illustrates a radio IC circuitry for use in the radio architecture of FIG. 12 in accordance with some aspects.

FIG. 14 illustrates radio IC circuitry 1400 in accordance with some aspects. The radio IC circuitry 1400 is one example of circuitry that may be suitable for use as the WLAN or BT radio IC circuitry 1206A or 1206B (FIG. 12), although other circuitry configurations may also be suitable.

In some aspects, the radio IC circuitry 1400 may include a receive signal path and a transmit signal path. The receive signal path of the radio IC circuitry 1400 may include at least mixer circuitry 1402, such as, for example, down-conversion mixer circuitry, amplifier circuitry 1406 and filter circuitry 1408. The transmit signal path of the radio IC circuitry 1400 may include at least filter circuitry 1412 and mixer circuitry 1414, such as, for example, up-conversion mixer circuitry. Radio IC circuitry 1400 may also include synthesizer circuitry 1404 for synthesizing an output frequency 1405 for use by the mixer circuitry 1402 and the mixer circuitry 1414. The mixer circuitry 1402 or 1414 may each, according to some aspects, be configured to provide direct conversion functionality. The latter type of circuitry presents a much simpler architecture as compared with standard super-heterodyne mixer circuitries, and any flicker noise brought about by the same may be alleviated for example through the use of OFDM modulation. FIG. 14 illustrates only a simplified version of a radio IC circuitry, and may include, although not shown, aspects where each of the depicted circuitries may include more than one component. For instance, mixer circuitry 1420 or 1414 may each include one or more mixers, and filter circuitries 1408 or 1412 may each include one or more filters, such as one or more BPFs or LPFs according to application needs. For example, when mixer circuitries are of the direct-conversion type, they may each include two or more mixers.

In some aspects, mixer circuitry 1402 may be configured to down-convert RF signals 1307 received from the FEM circuitry 1300 (FIG. 13) based on the synthesized output frequency 1405 provided by synthesizer circuitry 1404. The amplifier circuitry 1406 may be configured to amplify the down-converted signals and the filter circuitry 1408 may include a LPF configured to remove unwanted signals from the down-converted signals to generate output baseband signals 1407. Output baseband signals 1407 may be provided to the baseband processing circuitry 1208 (FIG. 12) for further processing. In some aspects, the output baseband signals 1407 may be zero-frequency baseband signals, although this is not a requirement. In some aspects, mixer circuitry 1402 may comprise passive mixers, although the scope of the aspects is not limited in this respect.

In some aspects, the mixer circuitry 1414 may be configured to up-convert input baseband signals 1411 based on the synthesized frequency 1405 provided by the synthesizer circuitry 1404 to generate RF output signals 1409 for the FEM circuitry 1300. The baseband signals 1411 may be provided by the baseband processing circuitry 1208 and may be filtered by filter circuitry 1412. The filter circuitry 1412 may include a LPF or a BPF, although the scope of the aspects is not limited in this respect.

In some aspects, the mixer circuitry 1402 and the mixer circuitry 1414 may each include two or more mixers and may be arranged for quadrature down-conversion or up-conversion respectively with the help of synthesizer circuitry 1404. In some aspects, the mixer circuitry 1402 and the mixer circuitry 1414 may each include two or more mixers each configured for image rejection (e.g., Hartley image rejection). In some aspects, the mixer circuitry 1402 and the mixer circuitry 1414 may be arranged for direct down-conversion or direct up-conversion, respectively. In some aspects, the mixer circuitry 1402 and the mixer circuitry 1414 may be configured for super-heterodyne operation, although this is not a requirement.

Mixer circuitry 1402 may comprise, according to one aspect: quadrature passive mixers (e.g., for the in-phase (I) and quadrature phase (Q) paths). In such an aspect, RF input signal 1407 from FIG. 14 may be down-converted to provide I and Q baseband output signals to be sent to the baseband processor Quadrature passive mixers may be driven by zero and ninety degree time-varying LO switching signals provided by a quadrature circuitry which may be configured to receive a LO frequency (fLO) from a local oscillator or a synthesizer, such as LO output frequency 1405 of synthesizer circuitry 1404 (FIG. 14). In some aspects, the LO frequency may be the carrier frequency, while in other aspects, the LO frequency may be a fraction of the carrier frequency (e.g., one-half the carrier frequency, one-third the carrier frequency). In some aspects, the zero and ninety degree time-varying switching signals may be generated by the synthesizer, although the scope of the aspects is not limited in this respect.

In some aspects, the LO signals may differ in duty cycle (the percentage of one period in which the LO signal is high) or offset (the difference between start points of the period). In some aspects, the LO signals may have a 25% duty cycle and a 50% offset. In some aspects, each branch of the mixer circuitry (e.g., the in-phase (I) and quadrature phase (Q) path) may operate at a 25% duty cycle, which may result in a significant reduction of power consumption.

The RF input signal 1407 (FIG. 14) may comprise a balanced signal, although the scope of the aspects is not limited in this respect. The I and Q baseband output signals may be provided to low-nose amplifier, such as amplifier circuitry 1406 (FIG. 14) or to filter circuitry 1408 (FIG. 14).

In some aspects, the output baseband signals 1407 and the input baseband signals 1411 may be analog baseband signals, although the scope of the aspects is not limited in this respect. In some alternate aspects, the output baseband signals 1407 and the input baseband signals 1411 may be digital baseband signals. In these alternate aspects, the radio IC circuitry may include analog-to-digital converter (ADC) and digital-to-analog converter (DAC) circuitry.

In some dual-mode aspects, a separate radio IC circuitry may be provided for processing signals for each spectrum, or for other spectrums not mentioned here, although the scope of the aspects is not limited in this respect.

In some aspects, the synthesizer circuitry 1404 may be a fractional-N synthesizer or a fractional N/N+1 synthesizer, although the scope of the aspects is not limited in this respect as other types of frequency synthesizers may be suitable. For example, synthesizer circuitry 1404 may be a delta-sigma synthesizer, a frequency multiplier, or a synthesizer comprising a phase-locked loop with a frequency divider. According to some aspects, the synthesizer circuitry 1404 may include digital synthesizer circuitry. An advantage of using a digital synthesizer circuitry is that, although it may still include some analog components, its footprint may be scaled down much more than the footprint of an analog synthesizer circuitry. In some aspects, frequency input into synthesizer circuity 1404 may be provided by a voltage controlled oscillator (VCO), although that is not a requirement. A divider control input may further be provided by either the baseband processing circuitry 1208 (FIG. 12) or the application processor 1211 (FIG. 12) depending on the desired output frequency 1405. In some aspects, a divider control input (e.g., N) may be determined from a look-up table (e.g., within a Wi-Fi card) based on a channel number and a channel center frequency as determined or indicated by the application processor 1211.

In some aspects, synthesizer circuitry 1404 may be configured to generate a carrier frequency as the output frequency 1405, while in other aspects, the output frequency 1405 may be a fraction of the carrier frequency (e.g., one-half the carrier frequency, one-third the carrier frequency). In some aspects, the output frequency 1405 may be a LO frequency (fLO).

Figure 15:
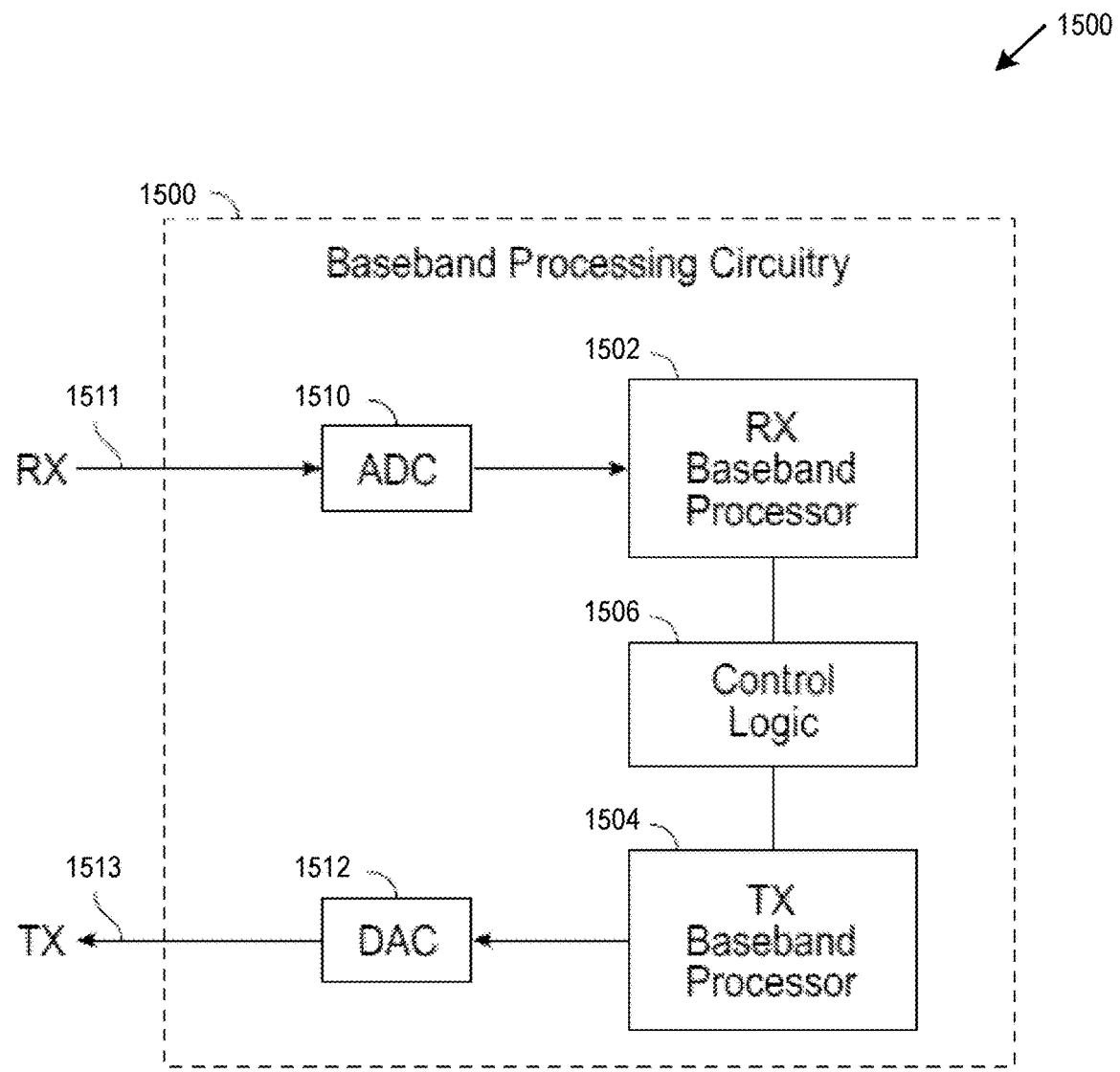
FIG. 15 illustrates a baseband processing circuitry for use in the radio architecture of FIG. 12 in accordance with some aspects.

FIG. 15 illustrates a functional block diagram of baseband processing circuitry 1500 in accordance with some aspects.

The baseband processing circuitry 1500 is one example of circuitry that may be suitable for use as the baseband processing circuitry 1208 (FIG. 12), although other circuitry configurations may also be suitable. The baseband processing circuitry 1500 may include a receive baseband processor (RX BBP) 1502 for processing receive baseband signals 1409 provided by the radio IC circuitry 1206 (FIG. 12) and a transmit baseband processor (TX BBP) 1504 for generating transmit baseband signals 1411 for the radio IC circuitry 1206. The baseband processing circuitry 1500 may also include control logic 1506 for coordinating the operations of the baseband processing circuitry 1500.

In some aspects (e.g., when analog baseband signals are exchanged between the baseband processing circuitry 1500 and the radio IC circuitry 1206), the baseband processing circuitry 1500 may include ADC 1510 to convert analog baseband signals received from the radio IC circuitry 1206 to digital baseband signals for processing by the RX BBP 1502. In these aspects, the baseband processing circuitry 1500 may also include DAC 1512 to convert digital baseband signals from the TX BBP 1504 to analog baseband signals.

In some aspects that communicate OFDM signals or OFDMA signals, such as through WLAN baseband circuitry 1208A, the TX BBP 1504 may be configured to generate OFDM or OFDMA signals as appropriate for transmission by performing an inverse fast Fourier transform (IFFT). The RX BBP 1502 may be configured to process received OFDM signals or OFDMA signals by performing an FFT. In some aspects, the RX BBP 1502 may be configured to detect the presence of an OFDM signal or OFDMA signal by performing an autocorrelation, to detect a preamble, such as a short preamble, and by performing a cross-correlation, to detect a long preamble. The preambles may be part of a predetermined frame structure for Wi-Fi communication.

Referring back to FIG. 12, in some aspects, the antennas 1201 (FIG. 12) may each comprise one or more directional or omnidirectional antennas, including, for example, dipole antennas, monopole antennas, patch antennas, loop antennas, microstrip antennas or other types of antennas suitable for transmission of RF signals. In some multiple-input multiple-output (MIMO) aspects, the antennas may be effectively separated to take advantage of spatial diversity and the different channel characteristics that may result. Antennas 1201 may each include a set of phased-array antennas, although aspects are not so limited.

Although the radio-architecture 1200 is illustrated as having several separate functional elements, one or more of the functional elements may be combined and may be implemented by combinations of software-configured elements, such as processing elements including digital signal processors (DSPs), or other hardware elements. For example, some elements may comprise one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some aspects, the functional elements may refer to one or more processes operating on one or more processing elements.

Figure 16:
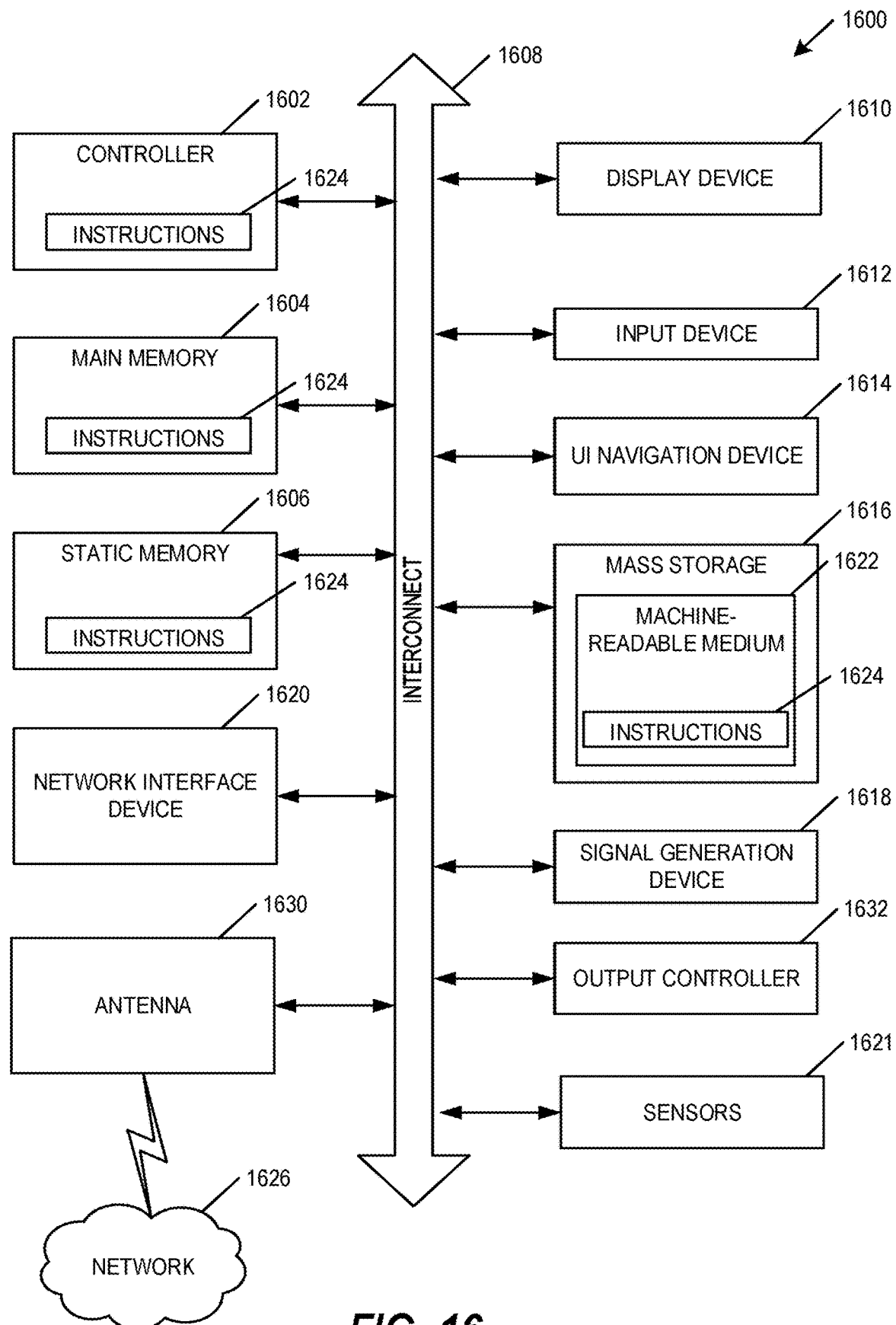
FIG. 16 illustrates a block diagram of an example machine for performing methods according to some aspects.

FIG. 16 illustrates a block diagram of an example machine 1600 upon which any one or more of the techniques (e.g., methodologies) discussed herein may be performed. In alternative aspects, the machine 1600 may operate as a standalone device or may be connected (e.g., networked) to other machines. In a networked deployment, the machine 1600 may operate in the capacity of a server machine, a client machine, or both in server-client network environments. In an example, the machine 1600 may act as a peer machine in peer-to-peer (P2P) (or other distributed) network environment. The machine 1600 may be a user equipment (UE), unmanned aerial vehicle (UAV) or other vehicle, evolved Node B (eNB), next generation evolved Node B (gNB), next generation access network (AN), next generation user plane function (UPF), Wi-Fi access point (AP), Wi-Fi station (STA), personal computer (PC), a tablet PC, a set-top box (STB), a personal digital assistant (PDA), a mobile telephone, a smart phone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate on, logic or a number of components, modules, or mechanisms. Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine-readable medium. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

Machine (e.g., computer system) 1600 may include a controller 1602 (e.g., a hardware processor, a central processing unit (CPU), a graphics processing unit (GPU), a hardware processor core, or any combination thereof), a main memory 1604 and a static memory 1606, some or all of which may communicate with each other via an interlink (e.g., bus) 1608. The machine 1600 may further include a display unit 1610, an alphanumeric input device 1612 (e.g., a keyboard), and a user interface (UI) navigation device 1614 (e.g., a mouse). In an example, the display unit 1610, input device 1612 and UI navigation device 1614 may be a touch screen display. The machine 1600 may additionally include a storage device (e.g., a drive unit) 1616, a signal generation device 1618 (e.g., a speaker), a network interface device 1620, and one or more sensors 1621. The sensors 1621 can include on-board vehicle sensors or other types of vehicle sensors such as speed sensors, etc. The sensors 1621 can include sensors capable of detecting location or for utilizing a service for detecting or determining location, such as a global positioning system (GPS) sensor, compass, accelerometer, or other sensor. The sensors 1621 can include sensors capable of detecting elevation. The machine 1600 may include an output controller 1632, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 1616 may include a machine-readable medium 1622 on which is stored one or more sets of data structures or instructions 1624 (e.g., software) embodying or utilized by any one or more of the techniques or functions described herein. The instructions 1624 may also reside, completely or at least partially, within the main memory 1604, within static memory 1606, or within the controller 1602 during execution thereof by the machine 1600. In an example, one or any combination of the controller 1602, the main memory 1604, the static memory 1606, or the storage device 1616 may constitute machine-readable media.

While the machine-readable medium 1622 is illustrated as a single medium, the term "machine-readable medium" may include a single medium or multiple media (e.g., a centralized or distributed database, or associated caches and servers) configured to store the one or more instructions 1624.

The term "machine-readable medium" may include any medium that is capable of storing, encoding, or carrying instructions for execution by the machine 1600 and that cause the machine 1600 to perform any one or more of the techniques of the present disclosure, or that is capable of storing, encoding or carrying data structures used by or associated with such instructions. Non-limiting machine-readable medium examples may include solid-state memories, and optical and magnetic media. Specific examples of machine-readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); and CD-ROM and DVD-ROM disks. In some examples, machine-readable media may include non-transitory machine-readable media. In some examples, machine-readable media may include machine-readable media that is not a transitory propagating signal.

The instructions 1624 may further be transmitted or received over a communications network 1626 using a transmission medium via the network interface device 1620 utilizing any one of a number of transfer protocols (e.g., frame relay, internet protocol (IP), transmission control protocol (TCP), user datagram protocol (UDP), hypertext transfer protocol (HTTP), etc.). In an example, the network interface device 1620 may include a plurality of antennas to wirelessly communicate using at least one of single-input multiple-output (SIMO), multiple-input multiple-output (MIMO), or multiple-input single-output (MISO) techniques. In some examples, the network interface device 1620 may wirelessly communicate using Multiple User MIMO techniques. The term "transmission medium" shall be taken to include any intangible medium that is capable of storing, encoding, or carrying instructions for execution by the machine 1600, and includes digital or analog communications signals or other intangible medium to facilitate communication of such software.

As used herein, the term "circuitry" may refer to, be part of, or include an Application Specific Integrated Circuit (ASIC), an electronic circuit, a processor (shared, dedicated, or group), or memory (shared, dedicated, or group) that execute one or more software or firmware programs, a combinational logic circuit, or other suitable hardware components that provide the described functionality. In some aspects, the circuitry may be implemented in, or functions associated with the circuitry may be implemented by, one or more software or firmware modules. In some aspects, circuitry may include logic, at least partially operable in hardware.

Figure 17:
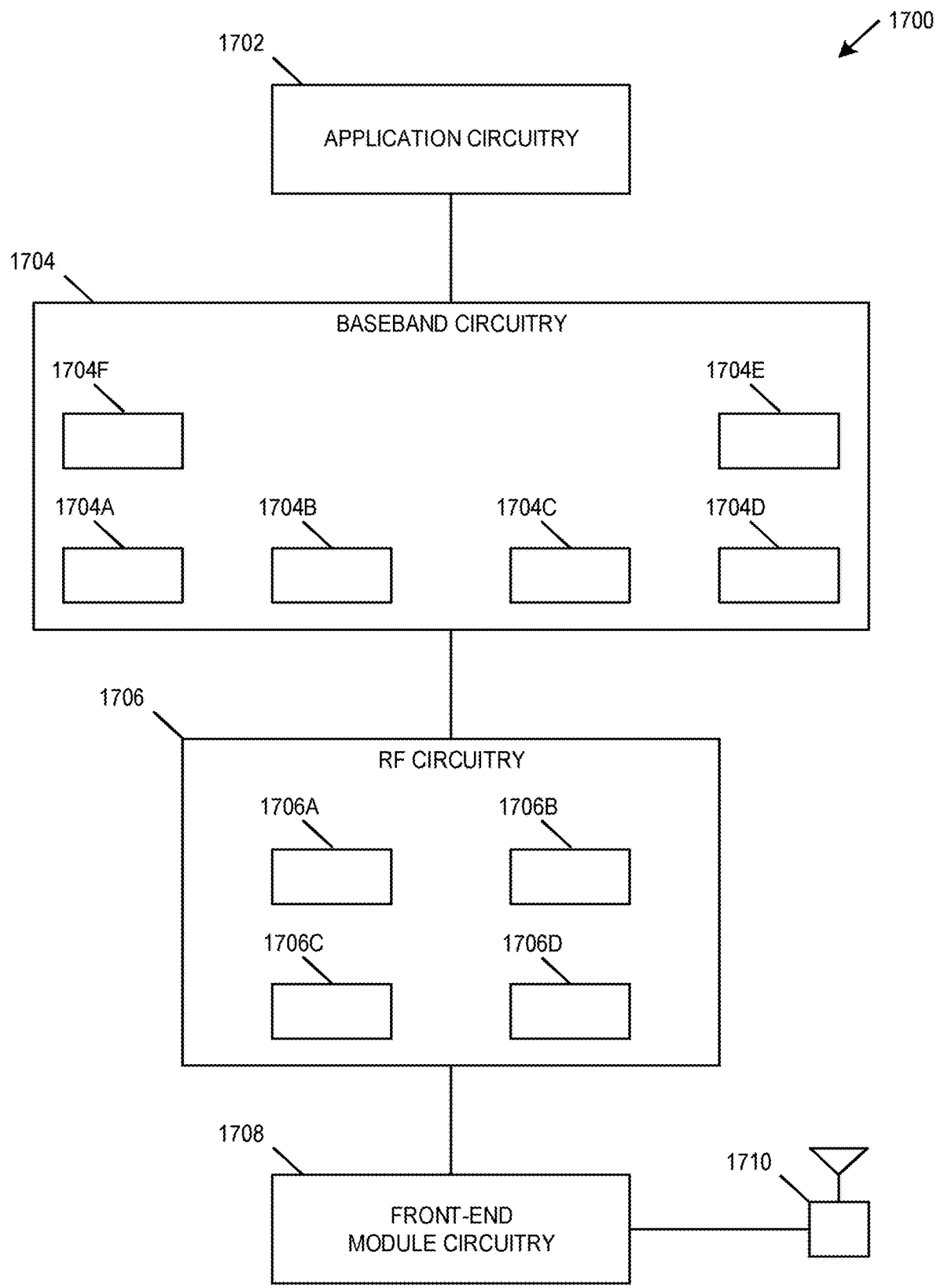
FIG. 17 illustrates an example of a user equipment (UE) device according to some aspects.

Aspects described herein may be implemented into a system using any suitably configured hardware or software. FIG. 17 illustrates, for one aspect, example components of a User Equipment (UE) device 1700. In some aspects, the UE device 1700 may include application circuitry 1702, baseband circuitry 1704, Radio Frequency (RF) circuitry 1706, front-end module (FEM) circuitry 1708 and one or more antennas 1710, coupled together at least as shown. In some aspects, the UE can be a drone or UAV.

The application circuitry 1702 may include one or more application processors. For example, the application circuitry 1702 may include circuitry such as, but not limited to, one or more single-core or multi-core processors. The processor(s) may include any combination of general-purpose processors and dedicated processors (e.g., graphics processors, application processors, etc.). The processors may be coupled with or may include memory/storage and may be configured to execute instructions stored in the memory/storage to enable various applications or operating systems to run on the system.

The baseband circuitry 1704 may include circuitry such as, but not limited to, one or more single-core or multi-core processors. The baseband circuitry 1704 may include one or more baseband processors or control logic to process baseband signals received from a receive signal path of the RF circuitry 1706 and to generate baseband signals for a transmit signal path of the RF circuitry 1706. Baseband circuity 1704 may interface with the application circuitry 1702 for generation and processing of the baseband signals and for controlling operations of the RF circuitry 1706. For example, in some aspects, the baseband circuitry 1704 may include a second generation (2G) baseband processor 1704A, third generation (3G) baseband processor 1704B, fourth generation (4G) baseband processor 1704C, or other baseband processor(s) 1704D for other existing generations, generations in development or to be developed in the future (e.g., fifth generation (5G), 6G, etc.). The baseband circuitry 1704 (e.g., one or more of baseband processors 1704A-D) may handle various radio control functions that enable communication with one or more radio networks via the RF circuitry 1706. The radio control functions may include, but are not limited to, signal modulation/demodulation, encoding/decoding, radio frequency shifting, etc. In some aspects, modulation/demodulation circuitry of the baseband circuitry 1704 may include Fast-Fourier Transform (FFT), precoding, or constellation mapping/demapping functionality. In some aspects, encoding/decoding circuitry of the baseband circuitry 1704 may include convolution, tail-biting convolution, turbo, Viterbi, or Low Density Parity Check (LDPC) encoder/decoder functionality. Aspects of modulation/demodulation and encoder/decoder functionality are not limited to these examples and may include other suitable functionality in other aspects.

In some aspects, the baseband circuitry 1704 may include elements of a protocol stack such as, for example, elements of an evolved universal terrestrial radio access network (EUTRAN) protocol including, for example, physical (PHY), media access control (MAC), radio link control (RLC), packet data convergence protocol (PDCP), or radio resource control (RRC) elements. A central processing unit (CPU) 1704E of the baseband circuitry 1704 may be configured to run elements of the protocol stack for signaling of the PHY, MAC, RLC, PDCP or RRC layers. In some aspects, the baseband circuitry may include one or more audio digital signal processor(s) (DSP) 1704F. The audio DSP(s) 1704F may be include elements for compression/decompression and echo cancellation and may include other suitable processing elements in other aspects. Components of the baseband circuitry may be suitably combined in a single chip, a single chipset, or disposed on a same circuit board in some aspects. In some aspects, some or all of the constituent components of the baseband circuitry 1704 and the application circuitry 1702 may be implemented together such as, for example, on a system on a chip (SOC).

In some aspects, the baseband circuitry 1704 may provide for communication compatible with one or more radio technologies. For example, in some aspects, the baseband circuitry 1704 may support communication with an evolved universal terrestrial radio access network (EUTRAN) or other wireless metropolitan area networks (WMAN), a wireless local area network (WLAN), a wireless personal area network (WPAN). Aspects in which the baseband circuitry 1704 is configured to support radio communications of more than one wireless protocol may be referred to as multi-mode baseband circuitry.

RF circuitry 1706 may enable communication with wireless networks using modulated electromagnetic radiation through a non-solid medium. In various aspects, the RF circuitry 1706 may include switches, filters, amplifiers, etc. to facilitate the communication with the wireless network. RF circuitry 1706 may include a receive signal path which may include circuitry to down-convert RF signals received from the FEM circuitry 1708 and provide baseband signals to the baseband circuitry 1704. RF circuitry 1706 may also include a transmit signal path which may include circuitry to up-convert baseband signals provided by the baseband circuitry 1704 and provide RF output signals to the FEM circuitry 1708 for transmission.

In some aspects, the RF circuitry 1706 may include a receive signal path and a transmit signal path. The receive signal path of the RF circuitry 1706 may include mixer circuitry 1706A, amplifier circuitry 1706B and filter circuitry 1706C. The transmit signal path of the RF circuitry 1706 may include filter circuitry 1706C and mixer circuitry 1706A. RF circuitry 1706 may also include synthesizer circuitry 1706D for synthesizing a frequency for use by the mixer circuitry 1706A of the receive signal path and the transmit signal path. In some aspects, the mixer circuitry 1706A of the receive signal path may be configured to down-convert RF signals received from the FEM circuitry 1708 based on the synthesized frequency provided by synthesizer circuitry 1706D. The amplifier circuitry 1706B may be configured to amplify the down-converted signals and the filter circuitry 1706C may be a low-pass filter (LPF) or band-pass filter (BPF) configured to remove unwanted signals from the down-converted signals to generate output baseband signals. Output baseband signals may be provided to the baseband circuitry 1704 for further processing. In some aspects, the output baseband signals may be zero-frequency baseband signals, although this is not a requirement. In some aspects, mixer circuitry 1706A of the receive signal path may comprise passive mixers, although the scope of the aspects is not limited in this respect.

In some aspects, the mixer circuitry 1706A of the transmit signal path may be configured to up-convert input baseband signals based on the synthesized frequency provided by the synthesizer circuitry 1706D to generate RF output signals for the FEM circuitry 1708. The baseband signals may be provided by the baseband circuitry 1704 and may be filtered by filter circuitry 1706C. The filter circuitry 1706C may include a low-pass filter (LPF), although the scope of the aspects is not limited in this respect.

In some aspects, the mixer circuitry 1706A of the receive signal path and the mixer circuitry 1706A of the transmit signal path may include two or more mixers and may be arranged for quadrature downconversion or upconversion respectively. In some aspects, the mixer circuitry 1706A of the receive signal path and the mixer circuitry 1706A of the transmit signal path may include two or more mixers and may be arranged for image rejection (e.g., Hartley image rejection). In some aspects, the mixer circuitry 1706A of the receive signal path and the mixer circuitry 1706A of the transmit signal path may be arranged for direct downconversion or direct upconversion, respectively. In some aspects, the mixer circuitry 1706A of the receive signal path and the mixer circuitry 1706A of the transmit signal path may be configured for super-heterodyne operation.

In some aspects, the output baseband signals and the input baseband signals may be analog baseband signals, although the scope of the aspects is not limited in this respect. In some alternate aspects, the output baseband signals and the input baseband signals may be digital baseband signals. In these alternate aspects, the RF circuitry 1706 may include analog-to-digital converter (ADC) and digital-to-analog converter (DAC) circuitry and the baseband circuitry 1704 may include a digital baseband interface to communicate with the RF circuitry 1706.

In some dual-mode aspects, a separate radio IC circuitry may be provided for processing signals for each spectrum, although the scope of the aspects is not limited in this respect.

In some aspects, the synthesizer circuitry 1706D may be a fractional-N synthesizer or a fractional N/N+1 synthesizer, although the scope of the aspects is not limited in this respect as other types of frequency synthesizers may be suitable. For example, synthesizer circuitry 1706D may be a delta-sigma synthesizer, a frequency multiplier, or a synthesizer comprising a phase-locked loop with a frequency divider.

The synthesizer circuitry 1706D may be configured to synthesize an output frequency for use by the mixer circuitry 1706A of the RF circuitry 1706 based on a frequency input and a divider control input. In some aspects, the synthesizer circuitry 1706D may be a fractional N/N+1 synthesizer.

In some aspects, frequency input may be provided by a voltage controlled oscillator (VCO), although that is not a requirement. Divider control input may be provided by either the baseband circuitry 1704 or the applications circuitry 1702 depending on the desired output frequency. In some aspects, a divider control input (e.g., N) may be determined from a look-up table based on a channel indicated by the applications circuitry 1702.

Synthesizer circuitry 1706D of the RF circuitry 1706 may include a divider, a delay-locked loop (DLL), a multiplexer and a phase accumulator. In some aspects, the divider may be a dual modulus divider (DMD) and the phase accumulator may be a digital phase accumulator (DPA). In some aspects, the DMD may be configured to divide the input signal by either N or N+1 (e.g., based on a carry out) to provide a fractional division ratio. In some example aspects, the DLL may include a set of cascaded, tunable, delay elements, a phase detector, a charge pump and a D-type flip-flop. In these aspects, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some aspects, synthesizer circuitry 1706D may be configured to generate a carrier frequency as the output frequency, while in other aspects, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some aspects, the output frequency may be a LO frequency (fLO). In some aspects, the RF circuitry 1706 may include an IQ/polar converter.

FEM circuitry 1708 may include a receive signal path which may include circuitry configured to operate on RF signals received from one or more antennas 1710, amplify the received signals and provide the amplified versions of the received signals to the RF circuitry 1706 for further processing. FEM circuitry 1708 may also include a transmit signal path which may include circuitry configured to amplify signals for transmission provided by the RF circuitry 1706 for transmission by one or more of the one or more antennas 1710.

In some aspects, the FEM circuitry 1708 may include a TX/RX switch to switch between transmit mode and receive mode operation. The FEM circuitry 1708 may include a receive signal path and a transmit signal path. The receive signal path of the FEM circuitry 1708 may include a low-noise amplifier (LNA) to amplify received RF signals and provide the amplified received RF signals as an output (e.g., to the RF circuitry 1706). The transmit signal path of the FEM circuitry 1708 may include a power amplifier (PA) to amplify input RF signals (e.g., provided by RF circuitry 1706), and one or more filters to generate RF signals for subsequent transmission (e.g., by one or more of the one or more antennas 1710.

In some aspects, the UE device 1700 may include additional elements such as, for example, memory/storage, display, camera, sensor, or input/output (I/O) interface.

Figure 18:
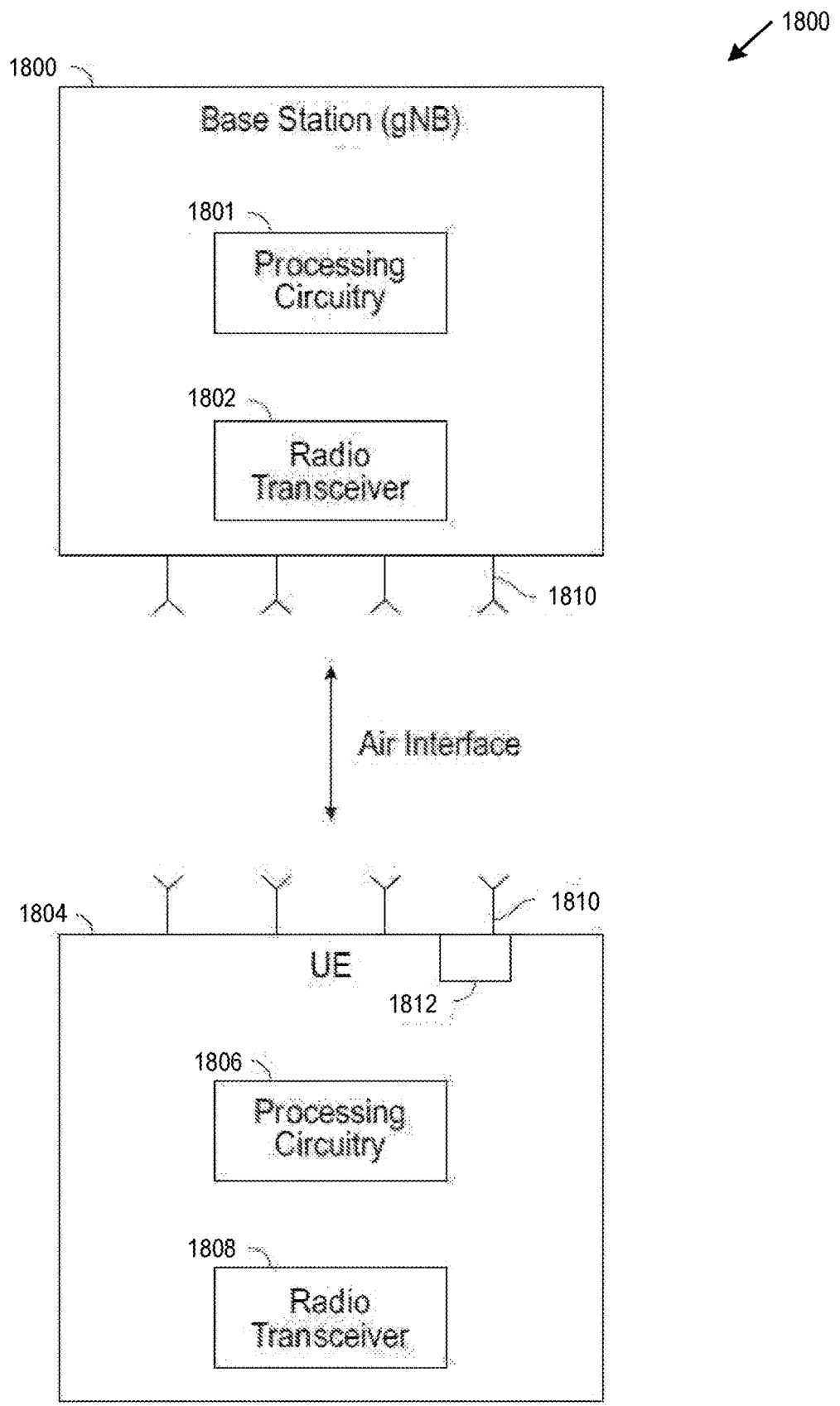
FIG. 18 illustrates an example UE and a base station (BS) such as an Evolved Node-B (eNB) or Next Generation Node-B (gNB) according to some aspects.

In Long Term Evolution (LTE) and 5G systems, a mobile terminal (referred to as a User Equipment or UE) connects to the cellular network via a base station (BS), referred to as an evolved Node B or eNB in LTE systems and as a next generation evolved Node B or gNB in 5G or NR systems. FIG. 18 illustrates an example of the components of a UE 1804 and a base station (e.g., eNB or gNB) 1800. The BS 1800 includes processing circuitry 1801 connected to a radio transceiver 1802 for providing an air interface. The UE 1804 includes processing circuitry 1806 connected to a radio transceiver 1808 for providing an air interface over the wireless medium. Each of the transceivers in the devices is connected to antennas 1810. The antennas 1810 of the devices form antenna arrays whose directionality may be controlled by the processing circuitry. In examples, the antennas 1810 can be coupled to electrical or mechanical apparatuses to tilt antennas 1810 toward targeted cells. In examples, the antennas 1810 can include at least two receiving antennas, and the at least two receiving antennas can include at least one omni-directional antenna and at least one directional antenna for measuring Reference Signal Received Power (RSRP) or a similar value. The memory and processing circuitries of the UE or BS may be configured to perform the functions and implement the schemes of the various aspects described herein. The UE can also be configured to operate as a drone or UAV.

Any of the radio links described herein may operate according to any one or more of the following radio communication technologies or standards including but not limited to: a Global System for Mobile Communications (GSM) radio communication technology, a General Packet Radio Service (GPRS) radio communication technology, an Enhanced Data Rates for GSM Evolution (EDGE) radio communication technology, or a Third Generation Partnership Project (3GPP) radio communication technology, for example Universal Mobile Telecommunications System (UMTS), Freedom of Multimedia Access (FOMA), 3GPP Long Term Evolution (LTE), 3GPP Long Term Evolution Advanced (LTE Advanced), Code division multiple access 2000 (CDMA2000), Cellular Digital Packet Data (CDPD), Mobitex, Third Generation (3G), Circuit Switched Data (CSD), High-Speed Circuit-Switched Data (HSCSD), Universal Mobile Telecommunications System (Third Generation) (UMTS (3G)), Wideband Code Division Multiple Access (Universal Mobile Telecommunications System) (W-CDMA (UMTS)), High Speed Packet Access (HSPA), High-Speed Downlink Packet Access (HSDPA), High-Speed Uplink Packet Access (HSUPA), High Speed Packet Access Plus (HSPA+), Universal Mobile Telecommunications System-Time-Division Duplex (UMTS-TDD), Time Division-Code Division Multiple Access (TD-CDMA), Time Division-Synchronous Code Division Multiple Access (TD-CDMA), 3rd Generation Partnership Project Release 8 (Pre-4th Generation) (3GPP Rel. 8 (Pre-4G)), 3GPP Rel. 9 (3rd Generation Partnership Project Release 9), 3GPP Rel. 10 (3rd Generation Partnership Project Release 10), 3GPP Rel. 11 (3rd Generation Partnership Project Release 11), 3GPP Rel. 12 (3rd Generation Partnership Project Release 12), 3GPP Rel. 13 (3rd Generation Partnership Project Release 13), 3GPP Rel. 14 (3rd Generation Partnership Project Release 14), 3GPP Rel. 15 (3rd Generation Partnership Project Release 15), 3GPP Rel. 16 (3rd Generation Partnership Project Release 16), 3GPP Rel. 17 (3rd Generation Partnership Project Release 17) and subsequent Releases (such as Rel. 18, Rel. 19, etc.), 3GPP 5G, 3GPP LTE Extra, LTE-Advanced Pro, LTE Licensed-Assisted Access (LAA), MuLTEfire, UMTS Terrestrial Radio Access (UTRA), Evolved UMTS Terrestrial Radio Access (E-UTRA), Long Term Evolution Advanced (4th Generation) (LTE Advanced (4G)), cdmaOne (2G), Code division multiple access 2000 (Third generation) (CDMA2000 (3G)), Evolution-Data Optimized or Evolution-Data Only (EV-DO), Advanced Mobile Phone System (1st Generation) (AMPS (1G)), Total Access Communication System/Extended Total Access Communication System (TACS/ETACS), Digital AMPS (2nd Generation) (D-AMPS (2G)), Push-to-talk (PTT), Mobile Telephone System (MTS), Improved Mobile Telephone System (IMTS), Advanced Mobile Telephone System (AMTS), OLT (Norwegian for Offentlig Landmobil Telefoni, Public Land Mobile Telephony), MTD (Swedish abbreviation for Mobiltelefonisystem D, or Mobile telephony system D), Public Automated Land Mobile (Autotel/PALM), ARP (Finnish for Autoradiopuhelin, "car radio phone"), NMT (Nordic Mobile Telephony), High capacity version of NTT (Nippon Telegraph and Telephone) (Hicap), Cellular Digital Packet Data (CDPD), Mobitex, DataTAC, Integrated Digital Enhanced Network (iDEN), Personal Digital Cellular (PDC), Circuit Switched Data (CSD), Personal Handy-phone System (PHS), Wideband Integrated Digital Enhanced Network (WiDEN), iBurst, Unlicensed Mobile Access (UMA), also referred to as 3GPP Generic Access Network, or GAN standard), Zigbee, Bluetooth (r), Wireless Gigabit Alliance (WiGig) standard, mmWave standards in general (wireless systems operating at 10-300 GHz and above such as WiGig, IEEE 802.11ad, IEEE 802.11ay, etc.), technologies operating above 300 GHz and THz bands, (3GPP/LTE based or IEEE 802.11p and other) Vehicle-to-Vehicle (V2V) and Vehicle-to-X (V2X) and Vehicle-to-Infrastructure (V2I) and Infrastructure-to-Vehicle (I2V) communication technologies, 3GPP cellular V2X, DSRC (Dedicated Short Range Communications) communication systems such as Intelligent-Transport-Systems and others (typically operating in 5850 MHz to 5925 MHZ), the European ITS-G5 system (i.e. the European flavor of IEEE 802.11p based DSRC, including ITS-G5A (i.e., Operation of ITS-G5 in European ITS frequency bands dedicated to ITS for safety related applications in the frequency range 5,875 GHz to 5,905 GHZ), ITS-G5B (i.e., Operation in European ITS frequency bands dedicated to ITS non-safety applications in the frequency range 5,855 GHz to 5,875 GHZ), ITS-G5C (i.e., Operation of ITS applications in the frequency range 5,470 GHz to 5,725 GHZ)), DSRC in Japan in the 700 MHz band (including 715 MHz to 725 MHz) etc.

Aspects described herein can be used in the context of any spectrum management scheme including dedicated licensed spectrum, unlicensed spectrum, (licensed) shared spectrum (such as LSA=Licensed Shared Access in 2.3-2.4 GHz, 3.4-3.6 GHz, 3.6-3.8 GHz and further frequencies and SAS=Spectrum Access System/CBRS=Citizen Broadband Radio System in 3.55-3.7 GHz and further frequencies). Applicable spectrum bands include IMT (International Mobile Telecommunications) spectrum as well as other types of spectrum/bands, such as bands with national allocation.

To better illustrate the method and apparatuses disclosed herein, a non-limiting list of embodiments is provided here.

Example 1 is an autonomous vehicle distributed services system comprising: a content delivery network device to receive a services content data set from a cloud device; and a mobile edge computing device to: receive the services content data set from the content delivery network device; generate a services advertisement data set based on the services content data set; and provide service access to an autonomous vehicle based on the services advertisement data set.

In Example 2, the subject matter of Example 1 optionally includes wherein the services content data set includes at least one of a high definition vehicle navigation data set, a smart parking service data set, a vehicle software update data set, a vehicle firmware update data set, a vehicle security patch data set, a location-based traffic data set, a location-based weather data set, an entertainment service data set, and an office service data set.

In Example 3, the subject matter of any one or more of Examples 1-2 optionally include a roadside unit to: receive the services advertisement data set from the mobile edge computing device; and receive a services subscription data set from the autonomous vehicle, wherein the provision of the service access is based on the services subscription data set.

In Example 4, the subject matter of Example 3 optionally includes wherein the mobile edge computing device is further configured to: provide the generated services advertisement data set to the autonomous vehicle; and receive the services subscription data set from the autonomous vehicle, wherein the provision of the service access is based on the services subscription data set.

In Example 5, the subject matter of any one or more of Examples 3-4 optionally include an edge node device to: provide the services advertisement data set to the autonomous vehicle; receive the services subscription data set from the autonomous vehicle; and authenticate a service access for the autonomous vehicle based on the services subscription data set.

In Example 6, the subject matter of any one or more of Examples 3-5 optionally include wherein the roadside unit is further configured to: provide the services advertisement data set to the autonomous vehicle; receive the services subscription data set from the autonomous vehicle; and authenticate the service access for the autonomous vehicle based on the services subscription data set.

In Example 7, the subject matter of any one or more of Examples 3-6 optionally include wherein the roadside unit is further configured to: provide a vehicle authentication request from the roadside unit to the cloud device; and receive a vehicle authentication verification, wherein the provision of the service access is based on the vehicle authentication verification.

In Example 8, the subject matter of any one or more of Examples 5-7 optionally include wherein the edge node device is further configured to: provide the vehicle authentication request from the edge node device to the cloud device; and receive the vehicle authentication verification, wherein the provision of the service access includes sending a plurality of service data, the plurality of service data encrypted based on the vehicle authentication verification.

In Example 9, the subject matter of any one or more of Examples 1-8 optionally include wherein: the cloud device provides a one-time decryption key to the autonomous vehicle; the edge node device communicates with the autonomous vehicle based on messages encrypted based on a one-time encryption key, the one-time decryption key providing decryption of messages encrypted using the one-time encryption key; and the roadside unit communicates with the autonomous vehicle based on messages encrypted based on the one-time encryption key.

Example 10 is an autonomous vehicle distributed services method comprising: receiving a services content data set at a content delivery network device from a cloud device; receiving the services content data set at a mobile edge computing device from the content delivery network device; generating a services advertisement data set based on the services content data set; and providing service access to an autonomous vehicle based on the services advertisement data set.

In Example 11, the subject matter of Example 10 optionally includes receiving the services advertisement data set at a roadside unit from the mobile edge computing device; and receiving a services subscription data set from the autonomous vehicle at the roadside unit, wherein the provision of the service access is based on the services subscription data set.

In Example 12, the subject matter of Example 11 optionally includes providing the generated services advertisement data set to the autonomous vehicle; and receiving the services subscription data set from the autonomous vehicle, wherein the provision of the service access is based on the services subscription data set.

In Example 13, the subject matter of any one or more of Examples 11-12 optionally include providing the services advertisement data set from an edge node device to the autonomous vehicle; receiving the services subscription data set from the autonomous vehicle; and authenticating a service access for the autonomous vehicle based on the services subscription data set.

In Example 14, the subject matter of any one or more of Examples 11-13 optionally include providing the services advertisement data set to the autonomous vehicle; receiving the services subscription data set from the autonomous vehicle; and authenticating the service access for the autonomous vehicle based on the services subscription data set.

In Example 15, the subject matter of any one or more of Examples 11-14 optionally include providing a vehicle authentication request from the roadside unit to the cloud device; and receiving a vehicle authentication verification, wherein the provision of the service access is based on the vehicle authentication verification.

In Example 16, the subject matter of any one or more of Examples 13-15 optionally include providing the vehicle authentication request from the edge node device to the cloud device; and receiving the vehicle authentication verification, wherein the provision of the service access includes sending a plurality of service data, the plurality of service data encrypted based on the vehicle authentication verification.

In Example 17, the subject matter of any one or more of Examples 10-16 optionally include providing a one-time decryption key from the cloud device to the autonomous vehicle; wherein: the edge node device communicates with the autonomous vehicle based on messages encrypted based on a one-time encryption key, the one-time decryption key providing decryption of messages encrypted using the one-time encryption key; and the roadside unit communicates with the autonomous vehicle based on messages encrypted based on the one-time encryption key.

Example 18 is at least one machine-readable medium including instructions, which when executed by a computing system, cause the computing system to perform any of the methods of Examples 10-17.

Example 19 is an apparatus comprising means for performing any of the methods of Examples 10-17.

Example 20 is at least one non-transitory machine-readable storage medium, comprising a plurality of instructions that, responsive to being executed with processor circuitry of a computer-controlled device, cause the computer-controlled device to: receive a services content data set at a content delivery network device from a cloud device; receive the services content data set at a mobile edge computing device from the content delivery network device; generate a services advertisement data set based on the services content data set; and provide service access to an autonomous vehicle based on the services advertisement data set.

In Example 21, the subject matter of Example 20 optionally includes the instructions further causing the computer-controlled device to: receive the services advertisement data set at a roadside unit from the mobile edge computing device; and receive a services subscription data set from the autonomous vehicle at the roadside unit, wherein the provision of the service access is based on the services subscription data set.

In Example 22, the subject matter of Example 21 optionally includes the instructions further causing the computer-controlled device to: provide the generated services advertisement data set to the autonomous vehicle; and receive the services subscription data set from the autonomous vehicle, wherein the provision of the service access is based on the services subscription data set.

In Example 23, the subject matter of any one or more of Examples 21-22 optionally include the instructions further causing the computer-controlled device to: provide the services advertisement data set from an edge node device to the autonomous vehicle; receive the services subscription data set from the autonomous vehicle; and authenticate a service access for the autonomous vehicle based on the services subscription data set.

In Example 24, the subject matter of any one or more of Examples 21-23 optionally include the instructions further causing the computer-controlled device to: provide the services advertisement data set to the autonomous vehicle; receive the services subscription data set from the autonomous vehicle; and authenticate the service access for the autonomous vehicle based on the services subscription data set.

In Example 25, the subject matter of any one or more of Examples 21-24 optionally include the instructions further causing the computer-controlled device to: provide a vehicle authentication request from the roadside unit to the cloud device; and receive a vehicle authentication verification, wherein the provision of the service access is based on the vehicle authentication verification.

In Example 26, the subject matter of any one or more of Examples 23-25 optionally include the instructions further causing the computer-controlled device to: provide the vehicle authentication request from the edge node device to the cloud device; and receive the vehicle authentication verification, wherein the provision of the service access includes sending a plurality of service data, the plurality of service data encrypted based on the vehicle authentication verification.

In Example 27, the subject matter of any one or more of Examples 20-26 optionally include the instructions further causing the computer-controlled device to provide a one-time decryption key from the cloud device to the autonomous vehicle; wherein: the edge node device communicates with the autonomous vehicle based on messages encrypted based on a one-time encryption key, the one-time decryption key providing decryption of messages encrypted using the one-time encryption key; and the roadside unit communicates with the autonomous vehicle based on messages encrypted based on the one-time encryption key.

Example 28 is an autonomous vehicle distributed services apparatus comprising: means for receiving a services content data set at a content delivery network device from a cloud device; means for receiving the services content data set at a mobile edge computing device from the content delivery network device; means for generating a services advertisement data set based on the services content data set; and means for providing service access to an autonomous vehicle based on the services advertisement data set.

In Example 29, the subject matter of Example 28 optionally includes means for receiving the services advertisement data set at a roadside unit from the mobile edge computing device; and means for receiving a services subscription data set from the autonomous vehicle at the roadside unit, wherein the provision of the service access is based on the services subscription data set.

In Example 30, the subject matter of Example 29 optionally includes means for providing the generated services advertisement data set to the autonomous vehicle; and means for receiving the services subscription data set from the autonomous vehicle, wherein the provision of the service access is based on the services subscription data set.

In Example 31, the subject matter of any one or more of Examples 29-30 optionally include means for providing the services advertisement data set from an edge node device to the autonomous vehicle; means for receiving the services subscription data set from the autonomous vehicle; and means for authenticating a service access for the autonomous vehicle based on the services subscription data set.

In Example 32, the subject matter of any one or more of Examples 29-31 optionally include means for providing the services advertisement data set to the autonomous vehicle; means for receiving the services subscription data set from the autonomous vehicle; and means for authenticating the service access for the autonomous vehicle based on the services subscription data set.

In Example 33, the subject matter of any one or more of Examples 29-32 optionally include means for providing a vehicle authentication request from the roadside unit to the cloud device; and means for receiving a vehicle authentication verification, wherein the provision of the service access is based on the vehicle authentication verification.

In Example 34, the subject matter of any one or more of Examples 31-33 optionally include means for providing the vehicle authentication request from the edge node device to the cloud device; and means for receiving the vehicle authentication verification, wherein the provision of the service access includes sending a plurality of service data, the plurality of service data encrypted based on the vehicle authentication verification.

In Example 35, the subject matter of any one or more of Examples 28-34 optionally include means for providing a one-time decryption key from the cloud device to the autonomous vehicle; wherein: the edge node device communicates with the autonomous vehicle based on messages encrypted based on a one-time encryption key, the one-time decryption key providing decryption of messages encrypted using the one-time encryption key; and the roadside unit communicates with the autonomous vehicle based on messages encrypted based on the one-time encryption key.

Example 36 is a quality of service predictive system comprising: an application server to receive a plurality of network parameters and generate a plurality of vehicle service application information; and a quality of experience device to: receive a plurality of quality of experience measurements from a plurality of remote devices; generate the plurality of network parameters based on the plurality of quality of experience measurements; receive the plurality of vehicle service application information from the application server; and generate a vehicle wireless communication quality of service data set based on the plurality of vehicle service application information and the plurality of quality of experience measurements.

In Example 37, the subject matter of Example 36 optionally includes the quality of experience device further to receive a plurality of vehicle service application information from a vehicle, wherein the generation of the vehicle wireless communication quality of service data set is further based on the plurality of vehicle service application information.

In Example 38, the subject matter of Example 37 optionally includes wherein the vehicle includes the quality of experience device.

In Example 39, the subject matter of any one or more of Examples 36-38 optionally include wherein the generation of the vehicle wireless communication quality of service data set includes: training a machine learning model based on the plurality of quality of experience measurements; and generating the vehicle wireless communication quality of service data set based on the trained machine learning model.

In Example 40, the subject matter of any one or more of Examples 36-39 optionally include wherein the plurality of remote devices includes a plurality of remote vehicles.

In Example 41, the subject matter of any one or more of Examples 36-40 optionally include wherein: the quality of experience device includes a network reconfiguration device to receive a network reconfiguration input; and the generation of the vehicle wireless communication quality of service data set is further based on the network reconfiguration input.

In Example 42, the subject matter of Example 41 optionally includes wherein the network reconfiguration device generates a network traffic analysis output based on the network reconfiguration input.

In Example 43, the subject matter of Example 42 optionally includes wherein the generation of the network traffic analysis output includes at least one of deep packet inspection and intelligent network traffic classification.

Example 44 is a quality of service predictive method comprising: receiving a plurality of network parameters at an application server; generating a plurality of vehicle service application information at the application server; receiving a plurality of quality of experience measurements at a quality of experience device from a plurality of remote devices; generating the plurality of network parameters based on the plurality of quality of experience measurements; receiving the plurality of vehicle service application information from the application server; and generating a vehicle wireless communication quality of service data set based on the plurality of vehicle service application information and the plurality of quality of experience measurements.

In Example 45, the subject matter of Example 44 optionally includes receiving a plurality of vehicle service application information from a vehicle, wherein the generation of the vehicle wireless communication quality of service data set is further based on the plurality of vehicle service application information.

In Example 46, the subject matter of Example 45 optionally includes wherein the vehicle includes the quality of experience device.

In Example 47, the subject matter of any one or more of Examples 44-46 optionally include wherein the generation of the vehicle wireless communication quality of service data set includes: training a machine learning model based on the plurality of quality of experience measurements; and generating the vehicle wireless communication quality of service data set based on the trained machine learning model.

In Example 48, the subject matter of any one or more of Examples 44-47 optionally include wherein the plurality of remote devices includes a plurality of remote vehicles.

In Example 49, the subject matter of any one or more of Examples 44-48 optionally include wherein: the quality of experience device includes a network reconfiguration device to receive a network reconfiguration input; and the generation of the vehicle wireless communication quality of service data set is further based on the network reconfiguration input.

In Example 50, the subject matter of Example 49 optionally includes wherein the network reconfiguration device generates a network traffic analysis output based on the network reconfiguration input.

In Example 51, the subject matter of Example 50 optionally includes wherein the generation of the network traffic analysis output includes at least one of deep packet inspection and intelligent network traffic classification.

Example 52 is at least one machine-readable medium including instructions, which when executed by a computing system, cause the computing system to perform any of the methods of Examples 44-51.

Example 53 is an apparatus comprising means for performing any of the methods of Examples 44-51.

Example 54 is at least one non-transitory machine-readable storage medium, comprising a plurality of instructions that, responsive to being executed with processor circuitry of a computer-controlled device, cause the computer-controlled device to: receive a plurality of network parameters at an application server; generate a plurality of vehicle service application information at the application server; receive a plurality of quality of experience measurements at a quality of experience device from a plurality of remote devices; generate the plurality of network parameters based on the plurality of quality of experience measurements; receive the plurality of vehicle service application information from the application server; and generate a vehicle wireless communication quality of service data set based on the plurality of vehicle service application information and the plurality of quality of experience measurements.

In Example 55, the subject matter of Example 54 optionally includes the instructions further causing the computer-controlled device to receive a plurality of vehicle service application information from a vehicle, wherein the generation of the vehicle wireless communication quality of service data set is further based on the plurality of vehicle service application information.

In Example 56, the subject matter of Example 55 optionally includes wherein the vehicle includes the quality of experience device.

In Example 57, the subject matter of any one or more of Examples 54-56 optionally include the instructions further causing the computer-controlled device to train a machine learning model based on the plurality of quality of experience measurements; and generate the vehicle wireless communication quality of service data set based on the trained machine learning model.

In Example 58, the subject matter of any one or more of Examples 54-57 optionally include wherein the plurality of remote devices includes a plurality of remote vehicles.

In Example 59, the subject matter of any one or more of Examples 54-58 optionally include wherein: the quality of experience device includes a network reconfiguration device to receive a network reconfiguration input; and the generation of the vehicle wireless communication quality of service data set is further based on the network reconfiguration input.

Example 60 is a quality of service predictive apparatus comprising: means for receiving a plurality of network parameters at an application server; means for generating a plurality of vehicle service application information at the application server; means for receiving a plurality of quality of experience measurements at a quality of experience device from a plurality of remote devices; means for generating the plurality of network parameters based on the plurality of quality of experience measurements; means for receiving the plurality of vehicle service application information from the application server; and means for generating a vehicle wireless communication quality of service data set based on the plurality of vehicle service application information and the plurality of quality of experience measurements.

In Example 61, the subject matter of Example 60 optionally includes means for receiving a plurality of vehicle service application information from a vehicle, wherein the generation of the vehicle wireless communication quality of service data set is further based on the plurality of vehicle service application information.

In Example 62, the subject matter of Example 61 optionally includes wherein the vehicle includes the quality of experience device.

In Example 63, the subject matter of any one or more of Examples 60-62 optionally include wherein the generation of the vehicle wireless communication quality of service data set includes: means for training a machine learning model based on the plurality of quality of experience measurements; and means for generating the vehicle wireless communication quality of service data set based on the trained machine learning model.

In Example 64, the subject matter of any one or more of Examples 60-63 optionally include wherein the plurality of remote devices includes a plurality of remote vehicles.

In Example 65, the subject matter of any one or more of Examples 60-64 optionally include wherein: the quality of experience device includes a network reconfiguration device to receive a network reconfiguration input; and the generation of the vehicle wireless communication quality of service data set is further based on the network reconfiguration input.

Example 66 is an optical wireless communication system comprising: an optical transducer to transduce an input signal into an optical signal; and an optical wireless communication lens to focus the optical signal onto an area of substantially uniform light intensity.

In Example 67, the subject matter of Example 66 optionally includes wherein the optical wireless communication lens is configured to focus the optical signal onto a vehicle area.

In Example 68, the subject matter of Example 67 optionally includes wherein the vehicle area includes an average vehicle distance and a vehicle distance range.

In Example 69, the subject matter of any one or more of Examples 67-68 optionally include wherein the vehicle area includes a substantially elliptical area that is longer in a vehicle travel direction and narrower perpendicular to a vehicle travel direction.

In Example 70, the subject matter of any one or more of Examples 66-69 optionally include an optical wireless communication receiver to receive a return transmission.

In Example 71, the subject matter of any one or more of Examples 66-70 optionally include a vehicular optical receiver to receive the focused optical signal.

In Example 72, the subject matter of Example 71 optionally includes wherein the vehicular optical receiver includes a plurality of optical detectors.

In Example 73, the subject matter of any one or more of Examples 71-72 optionally include wherein the vehicular optical receiver includes a mechanical actuator to adjust at least a portion of the vehicular optical receiver to improve the reception of the focused optical signal.

Example 74 is an optical wireless communication method comprising: transducing an input signal at an optical transducer into an optical signal; and focusing the optical signal at an optical wireless communication lens onto an area of substantially uniform light intensity.

In Example 75, the subject matter of Example 74 optionally includes wherein the optical wireless communication lens is configured to focus the optical signal onto a vehicle area.

In Example 76, the subject matter of Example 75 optionally includes wherein the vehicle area includes an average vehicle distance and a vehicle distance range.

In Example 77, the subject matter of any one or more of Examples 75-76 optionally include wherein the vehicle area includes a substantially elliptical area that is longer in a vehicle travel direction and narrower perpendicular to a vehicle travel direction.

In Example 78, the subject matter of any one or more of Examples 74-77 optionally include receiving a return transmission at an optical wireless communication receiver.

In Example 79, the subject matter of any one or more of Examples 74-78 optionally include receiving the focused optical signal at a vehicular optical receiver.

In Example 80, the subject matter of Example 79 optionally includes wherein the vehicular optical receiver includes a plurality of optical detectors.

In Example 81, the subject matter of any one or more of Examples 79-80 optionally include wherein the vehicular optical receiver includes a mechanical actuator to adjust at least a portion of the vehicular optical receiver to improve the reception of the focused optical signal.

Example 82 is at least one machine-readable medium including instructions, which when executed by a computing system, cause the computing system to perform any of the methods of Examples 74-81.

Example 83 is an apparatus comprising means for performing any of the methods of Examples 74-81.

Example 84 is at least one non-transitory machine-readable storage medium, comprising a plurality of instructions that, responsive to being executed with processor circuitry of a computer-controlled device, cause the computer-controlled device to: transduce an input signal at an optical transducer into an optical signal; and focus the optical signal at an optical wireless communication lens onto an area of substantially uniform light intensity.

In Example 85, the subject matter of Example 84 optionally includes wherein the optical wireless communication lens is configured to focus the optical signal onto a vehicle area.

In Example 86, the subject matter of Example 85 optionally includes wherein the vehicle area includes an average vehicle distance and a vehicle distance range.

In Example 87, the subject matter of any one or more of Examples 85-86 optionally include wherein the vehicle area includes a substantially elliptical area that is longer in a vehicle travel direction and narrower perpendicular to a vehicle travel direction.

In Example 88, the subject matter of any one or more of Examples 84-87 optionally include the instructions further causing the computer-controlled device to receive a return transmission at an optical wireless communication receiver.

In Example 89, the subject matter of any one or more of Examples 84-88 optionally include the instructions further causing the computer-controlled device to receive the focused optical signal at a vehicular optical receiver.

In Example 90, the subject matter of Example 89 optionally includes wherein the vehicular optical receiver includes a plurality of optical detectors.

In Example 91, the subject matter of any one or more of Examples 89-90 optionally include wherein the vehicular optical receiver includes a mechanical actuator to adjust at least a portion of the vehicular optical receiver to improve the reception of the focused optical signal.

Example 92 is an optical wireless communication apparatus comprising: means for transducing an input signal at an optical transducer into an optical signal; and means for focusing the optical signal at an optical wireless communication lens onto an area of substantially uniform light intensity.

In Example 93, the subject matter of Example 92 optionally includes wherein the optical wireless communication lens is configured to focus the optical signal onto a vehicle area.

In Example 94, the subject matter of Example 93 optionally includes wherein the vehicle area includes an average vehicle distance and a vehicle distance range.

In Example 95, the subject matter of any one or more of Examples 93-94 optionally include wherein the vehicle area includes a substantially elliptical area that is longer in a vehicle travel direction and narrower perpendicular to a vehicle travel direction.

In Example 96, the subject matter of any one or more of Examples 92-95 optionally include means for receiving a return transmission at an optical wireless communication receiver.

In Example 97, the subject matter of any one or more of Examples 92-96 optionally include means for receiving the focused optical signal at a vehicular optical receiver.

In Example 98, the subject matter of Example 97 optionally includes wherein the vehicular optical receiver includes a plurality of optical detectors.

In Example 99, the subject matter of any one or more of Examples 97-98 optionally include wherein the vehicular optical receiver includes a mechanical actuator to adjust at least a portion of the vehicular optical receiver to improve the reception of the focused optical signal.

Example 100 is at least one machine-readable medium including instructions, which when executed by a machine, cause the machine to perform operations of any of the operations of Examples 1-99.

Example 101 is an apparatus comprising means for performing any of the operations of Examples 1-99.

Example 102 is a system to perform the operations of any of the Examples 1-99.

Example 103 is a method to perform the operations of any of the Examples 1-99.

The above description is intended to be illustrative, and not restrictive. For example, the above-described examples (or one or more aspects thereof) may be used in combination with each other. Other aspects can be used, such as by one of ordinary skill in the art upon reviewing the above description. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed aspect. Thus, the following claims are hereby incorporated into the Detailed Description, with each claim standing on its own as a separate aspect. The scope of various aspects of the disclosure can be determined with reference to the appended claims, along with the full scope of equivalents to which such claims are entitled.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate aspect.

The above description is intended to be illustrative, and not restrictive. For example, the above-described examples (or one or more aspects thereof) may be used in combination with others. Other aspects may be used, such as by one of ordinary skill in the art upon reviewing the above description. The Abstract is to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. However, the claims may not set forth every feature disclosed herein as aspects may feature a subset of said features. Further, aspects may include fewer features than those disclosed in a particular example. Thus, the following claims are hereby incorporated into the Detailed Description, with a claim standing on its own as a separate aspect. The scope of the aspects disclosed herein is to be determined with reference to the appended claims, along with the full scope of equivalents to which such claims are entitled.

What is claimed is:

1. A method for quality of service (QoS) prediction, comprising:
   receiving Quality of Service (QoS) information from one or more remote devices;
   generating one or more network parameters based on the QoS information;
   receiving application information from an application server;
   receiving a network reconfiguration input; and
   generating a QoS map based on the application information, the network reconfiguration input, and the QoS information.

2. The method of claim 1,
   wherein the QoS information includes one or more of:
      information about performance of one or more autonomous navigation applications;
      vehicle measurements;
      quality of experience (QoE) experienced at a vehicle;
      information about a user of the vehicle;
      other vehicle information; or
      information about location of the vehicle.

3. The method of claim 1,
   wherein the QoS map indicates a level of quality of network service for one or more regions and areas of interference.

4. The method of claim 1, further comprising:
providing the generated QoS map to the one or more remote devices.

5. The method of claim 1, further comprising:
receiving a plurality of vehicle service application information from a vehicle, wherein generating the QoS map is further based on the plurality of vehicle service application information.

6. The method of claim 1,
wherein generating the QoS map based on the application information and the QoS information comprises:
training a machine learning model based on the application information and the QoS information; and
generating the QoS map based on the trained machine learning model.

7. The method of claim 1,
wherein the one or more remote devices include one or more remote vehicles.

8. The method of claim 1, further comprising:
generating a network traffic analysis output based on the network reconfiguration input.

9. The method of claim 8,
wherein generating the network traffic analysis output includes at least one of deep packet inspection or intelligent network traffic classification.

10. An apparatus, comprising:
a memory; and
at least one processor in communication with the memory and configured to:
receive Quality of Service (QoS) information from one or more remote devices;
generate one or more network parameters based on the QoS information;
receive application information from an application server;
receive a network reconfiguration input; and
generate a QoS map based on the application information, the network reconfiguration input, and the QoS information.

11. The apparatus of claim 10,
wherein the QoS information includes one or more of:
information about performance of one or more autonomous navigation applications;
vehicle measurements;
quality of experience (QoE) experienced at a vehicle;
information about a user of the vehicle;
other vehicle information; or
information about location of the vehicle.

12. The apparatus of claim 10,
wherein the QoS map indicates a level of quality of network service for one or more regions and areas of interference.

13. The apparatus of claim 10,
wherein the at least one processor is further configured to:
provide the generated QoS map to the one or more remote devices.

14. The apparatus of claim 10,
wherein the at least one processor is further configured to:
receive a plurality of vehicle service application information from a vehicle, wherein generating the QoS map is further based on the plurality of vehicle service application information.

15. The apparatus of claim 10,
wherein, to generate the QoS map based on the application information and the QoS information, the at least one processor is further configured to:
train a machine learning model based on the application information and the QoS information; and
generate the QoS map based on the trained machine learning model.

16. A non-transitory computer readable memory medium storing program instructions executable by a processor to cause a device to:
receive Quality of Service (QoS) information from one or more remote devices;
generate one or more network parameters based on the QoS information;
receive application information from an application server;
receive a network reconfiguration input; and
generate a QoS map based on the application information, the network reconfiguration input, and the QoS information.

17. The non-transitory computer readable memory medium of claim 16,
wherein the QoS information includes one or more of:
information about performance of one or more autonomous navigation applications;
vehicle measurements;
quality of experience (QoE) experienced at a vehicle;
information about a user of the vehicle;
other vehicle information; or
information about location of the vehicle.

18. The non-transitory computer readable memory medium of claim 16,
wherein the QoS map indicates a level of quality of network service for one or more regions and areas of interference.

19. The non-transitory computer readable memory medium of claim 16,
wherein the program instructions are further executable to cause the device to:
provide the generated QoS map to the one or more remote devices.

20. The non-transitory computer readable memory medium of claim 16,
wherein the program instructions are further executable to cause the device to:
receive a plurality of vehicle service application information from a vehicle, wherein generating the QoS map is further based on the plurality of vehicle service application information.

* * * * *